United States Patent
Tsunami et al.

(12) 
(10) Patent No.: US 6,735,431 B1
(45) Date of Patent: May 11, 2004

(54) INFORMATION COMMUNICATING METHOD, INFORMATION PROVIDING APPARATUS, RADIO-COMMUNICATION SYSTEM AND RADIO-COMMUNICATION TERMINAL

(75) Inventors: Katsuyuki Tsunami, Yokohama (JP); Yoshinao Kiuchi, Yokohama (JP); Ken Nanjo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/413,816

(22) Filed: Oct. 7, 1999

(30) Foreign Application Priority Data

Oct. 8, 1998 (JP) .......................................... 10-300340

(51) Int. Cl.[7] ............................................... H04Q 7/20
(52) U.S. Cl. ............................... 455/414.2; 455/456.3; 455/435.1
(58) Field of Search ................................ 455/456, 414, 455/457, 435, 433, 406, 414.1, 414.2, 414.3, 456.3, 435.1

(56) References Cited

U.S. PATENT DOCUMENTS

| | | | |
|---|---|---|---|
| 5,579,535 A | * | 11/1996 | Orlen et al. ................. 455/421 |
| 6,088,598 A | * | 7/2000 | Marsolais ..................... 455/566 |
| 6,101,381 A | * | 8/2000 | Tajima et al. ................ 455/414 |
| 6,101,387 A | * | 8/2000 | Granberg et al. ............. 455/433 |
| 6,356,761 B1 | * | 3/2002 | Huttunen et al. ............. 455/456 |
| 6,397,040 B1 | * | 5/2002 | Titmuss et al. ............. 455/67.1 |

FOREIGN PATENT DOCUMENTS

| | | |
|---|---|---|
| JP | 61-193527 | 8/1986 |
| JP | 8-97935 | 4/1996 |
| JP | 9-130861 | 5/1997 |
| JP | 9-261752 | 10/1997 |

* cited by examiner

*Primary Examiner*—Nick Corsano
(74) *Attorney, Agent, or Firm*—Mattingly, Stanger & Malur, P.C.

(57) ABSTRACT

Various kinds of presentation information specific to an area in a radio-communication system can be transmitted to a one or more specific radio-communication terminals at the same time. A user is able to receive commercial information, for example, from an information provider as presentation information when a user enters a location-registration area. A user terminal transmits a request for a location registration and the location-registration area and a terminal ID are transmitted to the information providing apparatus, which searches a database for a subscriber ID by using the terminal ID as a key and further searches a database for presentation-information ID by using the subscriber ID and the location-registration area information as a pair of keys. The presentation information is then transmitted to the terminal through a USCCH channel and displayed on a display unit of the terminal.

4 Claims, 21 Drawing Sheets

FIG.3

Subscriber - information management DB 703

| Terminal ID | Subscriber name | Subscriber - Information request ID |
|---|---|---|
| 12345674 | A | 0 |
| 12345675 | B | 0 |
| 12345676 | C | 0 |
| 12345677 | D | 1 |
| 12345678 | E | 0 |
| 12345679 | F | 1 |
| 12345680 | G | 0 |
| 12345681 | H | 0 |

(A)  First table 705

| Subscriber name | Subscriber data | | | | | | |
|---|---|---|---|---|---|---|---|
| | Age | Sex | Occupation | Requested info | Info providing fee | Counter | Subscriber ID |
| A | 018 | 0 | 010 | 00 | * | 10 | 0100100 |
| B | 060 | 0 | 545 | 00 | * | 50 | 0605400 |
| C | 020 | 1 | 011 | 00 | * | 3 | 0210100 |
| D | 021 | 1 | 012 | 00 | * | 4 | 0210100 |
| E | 005 | 0 | 050 | 20 | * | 100 | 0000520 |
| F | 032 | 1 | 282 | 03 | * | 120 | 0312803 |
| G | 038 | 1 | 283 | 08 | * | 3 | 0312808 |
| H | 024 | 0 | 311 | 00 | 10000 | 14 | 0203100 |

(B)  Second table 706

FIG.4
Presentation - information management DB 704

| Subscriber ID | Location registration area | Calendar ID | Presentation - information ID |
|---|---|---|---|
| 0000520 | 001 | 00 | 000052000000 |
| 0000520 | 002 | 00 | 000052000000 |
| 0000520 | 003 | 00 | 000052000000 |
| 0000520 | 004 | 00 | 000052000000 |
| 0000520 | 006 | 00 | 000052000000 |
| ... | ... | ... | ... |
| 0100100 | 001 | 10 | 010010000110 |
| 0100100 | 001 | 11 | 010010000111 |
| 0203100 | 001 | 00 | 020310000100 |
| 0210100 | 001 | 00 | 021010000100 |
| 0312803 | 020 | 00 | 031280302000 |
| 0312808 | 020 | 00 | 031280802000 |
| 0605400 | 001 | 00 | 060540000000 |
| 0605400 | 002 | 00 | 060540000000 |
| ... | ... | ... | ... |
| 0605400 | 099 | 00 | 060540000000 |

(A) Third table 707

| Presentation - information ID | Counter | Presentation information | | | Fee |
| | | Appended information | Information details | | |
|---|---|---|---|---|---|
| 000052000000 | 130 | * | Alarm information | | 0 |
| 010010000110 | 1400 | * | Video-rental information (○△ area) | | 0 |
| 010010000111 | 3564 | * | Restaurant information (○△ area) | | 0 |
| 020310000100 | 2043 | * | Video-rental information (○△ area) | | 100 |
| 021010000100 | 879 | 6 | Video-rental information (○△ area) | | 0 |
| 031280302000 | 13508 | * | Department-store information (◇● area) | | 0 |
| 031280802000 | 305 | * | Restaurant information (◇● area) | | 0 |
| 060540000000 | 24570 | * | Stock information (all areas) | | 0 |

(B) Fourth table 708

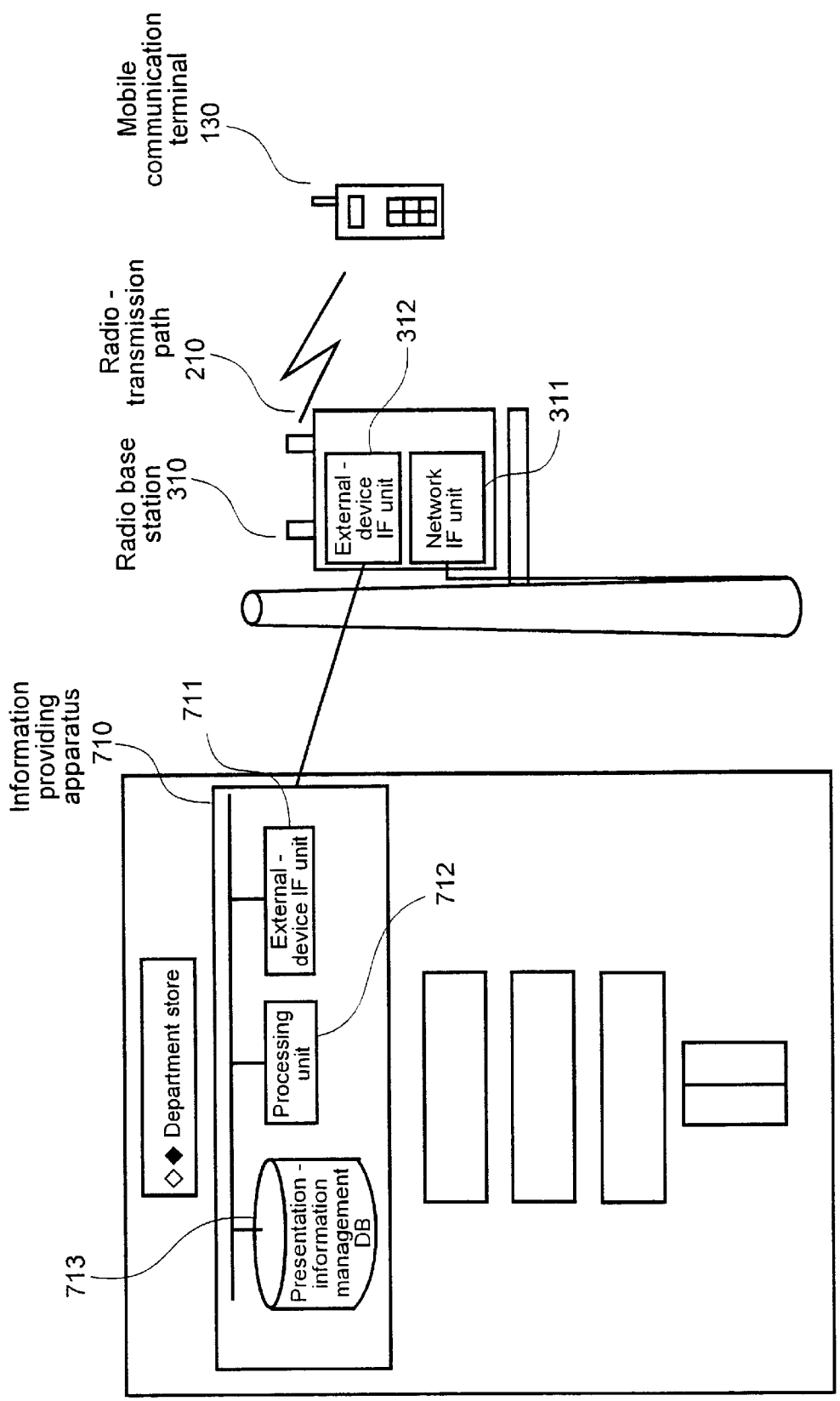

INFORMATION COMMUNICATING METHOD, INFORMATION PROVIDING APPARATUS, RADIO-COMMUNICATION SYSTEM AND RADIO-COMMUNICATION TERMINAL

BACKGROUND OF THE INVENTION

In general, the present invention relates to an information communicating method, an information providing apparatus, a radio-communication system and a radio-communication terminal. More particularly, the present invention relates to an information communicating method, an information providing apparatus, a radio-communication system and a radio-communication terminal wherein the information communicating method is used for notifying a specific radio-communication terminal in each specific area unit in the radio-communication system of presentation information peculiar to the specific area unit by using the presentation information.

Conventional information communicating services such those rendered by a paging system are explained as follows.

First of all, as a first conventional technology, there is provided a method of transmitting information from an information center to a pager terminal by way of a telephone-exchange station and displaying information by operations of a public telephone or the like carried out by a subscriber as is disclosed in Japanese Patent Laid-open No. Sho61-193527 entitled "Paging Method of Broadcast Messages".

In addition, as a second conventional technology, there is provided a method whereby information is stored in an information center which can be accessed by a subscriber from a telephone through a telephone-exchange station, the subscriber is allowed to enter data via the telephone in accordance with voice guidance given by the information center and the information center transmits information based on the data to a pager terminal as is disclosed in Japanese Patent Laid-open No. Hei8-97935 entitled "Method of Storing Information from Pager Terminals and Its Apparatus".

Furthermore, as a third conventional technology, there is provided a method whereby a subscriber makes a connection call from a mobile terminal to an information center through a telephone-exchange station in a radio-communication system to enter data via the mobile-communication terminal in accordance with instructions given by the information center and the information center transmits information based on the data to the mobile-communication terminal as is disclosed in Japanese Patent Laid-open No. Hei9-130861 entitled "Method of Presenting Information to a Mobile-Communication Terminal, Information Presentation System and Mobile Terminal" and Japanese Patent Laid-open No. Hei9-261752 entitled "Service Information Notification System and Service Information Communicating Method".

In the case of a method using a paging system like the first conventional technology, however, a range of subscribers recognized by the telephone-exchange station or a location-registration area for registering positions of subscribers is broadened. Thus, this method is suitable for dissemination of information good for a wide area such as news. On the other side of the coin, however, the method is not suitable for dissemination of information good for a narrow range such as information restricted to only a specific area.

In order to obtain information with the second conventional technology, 2 information terminals, namely, a telephone and a pager terminal, are required. In addition, a subscriber needs to make an access to the information center every time the subscriber wants to obtain information. Thus, the second conventional technology has a problem of extremely poor usability. In addition, in the case of the second conventional technology, transmission of information is triggered by a telephone call made by a subscriber so that the subscriber must pay the fee for the telephone call, hence, bearing a burden of a higher cost. Thus, the method provided by the second conventional technology is not suitable for dissemination of information such as commercial information and advertisements.

While only one information terminal is required in the method provided by the third conventional technology, a subscriber needs to make an access to the information center every time the subscriber wants to obtain information. In addition, in the case of the second conventional technology, transmission of information is triggered by a telephone call made by a subscriber so that the subscriber must pay the fee for the telephone call, hence, bearing a burden of a higher cost. Thus, the method provided by the third conventional technology is also not suitable for dissemination of information such as commercial information and advertisements as is the case with the second conventional technology.

SUMMARY OF THE INVENTION

It is thus an object of the present invention addressing the problems described above to allow various kinds of information peculiar to areas covered by a radio-communication system to be transmitted to a specific radio-communication terminal or a plurality of radio-communication terminals at the same time.

It is another object of the present invention to provide a network wherein information on positions of radio-communication terminals is controlled and recognized in area units narrower than areas of a cellular network or pager areas and information peculiar to a narrow area is transmitted to only radio-communication terminals located in a smallest unit area in which the position of a radio-communication terminal can be recognized or a plurality of such smallest unit areas. Examples of a smallest unit area are an area for registering positions of radio-communication terminals each allowed to make a telephone call in the network or an area in the network covered by a radio station.

It is a further object of the present invention to allow both the information provider and the subscriber to select information by recognition of the identification of the subscriber and the identification of information desired by the subscriber using subscriber data stored in a subscriber-information management data base (DB).

It is a still further object of the present invention to provide service media suitable for dissemination of information such as commercial information wherein it is not necessary for the subscriber to make an access to the radio-communication system each time the subscriber wants to obtain information and to prevent the cost burden borne by the subscriber from rising.

As a first solution means, the present invention provides an information communicating method adopted in a radio-communication system comprising a plurality of radio-communication terminals and a plurality of radio base stations carrying out radio-communications with said radio-communication terminal, said information communicating method comprising the steps of:

receiving a request for a location registration including information on a location-registration area and a terminal ID and coming from said radio-communication terminals located in one specific location-registration area or a plurality of specific location-registration areas which are each a smallest unit area recognizable by said radio-communication system;

searching for a subscriber-information-request ID and a subscriber ID from said terminal ID included in said received request; and if said subscriber-information-request ID found at said search step indicates that subscriber information is not required, communicating presentation information peculiar to said specific location-registration area as indicated by a presentation-information ID determined by said subscriber ID and said information on said specific location-registration area to said radio-communication terminal located in said specific location-registration area through a control signal channel.

As a second solution means, the present invention provides an information providing apparatus comprising:

a subscriber-information management data base (DB) for storing a subscriber-information-request ID and a subscriber ID for each terminal ID;

a presentation-information management DB for storing a presentation-information ID for said subscriber ID and presentation information for said presentation-information ID;

a network interface, connected to external devices, for receiving and transmitting signals; and a processing unit for carrying out processing to communicate presentation information on the basis of information stored in said subscriber-information management DB and said presentation-information management DB, wherein said processing comprises the steps of:

receiving a request for a location registration including information on a location-registration area and a terminal ID and coming from radio-communication terminals located in one specific location-registration area or a plurality of specific location-registration areas which are each a smallest unit area recognizable by a radio-communication system;

searching said subscriber-information management DB for a subscriber-information-request ID and a subscriber ID by using said terminal ID included in said received request;

searching said presentation-information management DB for a presentation-information ID by using said subscriber ID and said information on said specific location-registration area;

searching said presentation-information management DB for presentation information peculiar to said specific location-registration area by using said present-information ID; and communicating said presentation information to said radio-communication terminal located in said specific location-registration area through a control signal channel.

As a third solution means, the present invention provides a radio-communication system having an information providing apparatus connected to a radio base station, a switch or a network and used for communicating presentation information peculiar to a specific location-registration area to a radio-communication terminal located in said specific location-registration area through a control signal channel.

As a fourth solution means, the present invention provides a radio-communication terminal employed in a radio-communication system comprising a plurality of radio-communication terminals, a plurality of radio base stations communicating with said radio-communication terminals through radio-transmission paths and an information providing apparatus communicating presentation information by transmitting and receiving signals to and from said radio base stations, said radio-communication terminal comprising:

a display unit for displaying said presentation information received from said information providing apparatus employed in said radio-transmission system by way of one of said radio base stations through a control channel;

an input unit for inputting subscriber information used for selecting presentation information; and a control-channel processing unit for displaying said presentation information which is associated with information on a location-registration area and a terminal ID included in a request for a location registration made by said radio-communication terminal and transmitted by said information providing apparatus by using a control channel in response to said request for a location registration.

BRIEF DESCRIPTION OF THE DRAWINGS

FIG. 3 is an explanatory diagram showing the structure of a subscriber-information management DB;

FIG. 4 is an explanatory diagram showing the structure of a presentation-information management DB;

FIG. 21 is a diagram showing the configuration of a further embodiment implementing the radio-communication system to which the present invention is applied.

DESCRIPTION OF THE PREFERRED EMBODIMENT

Figure 1:
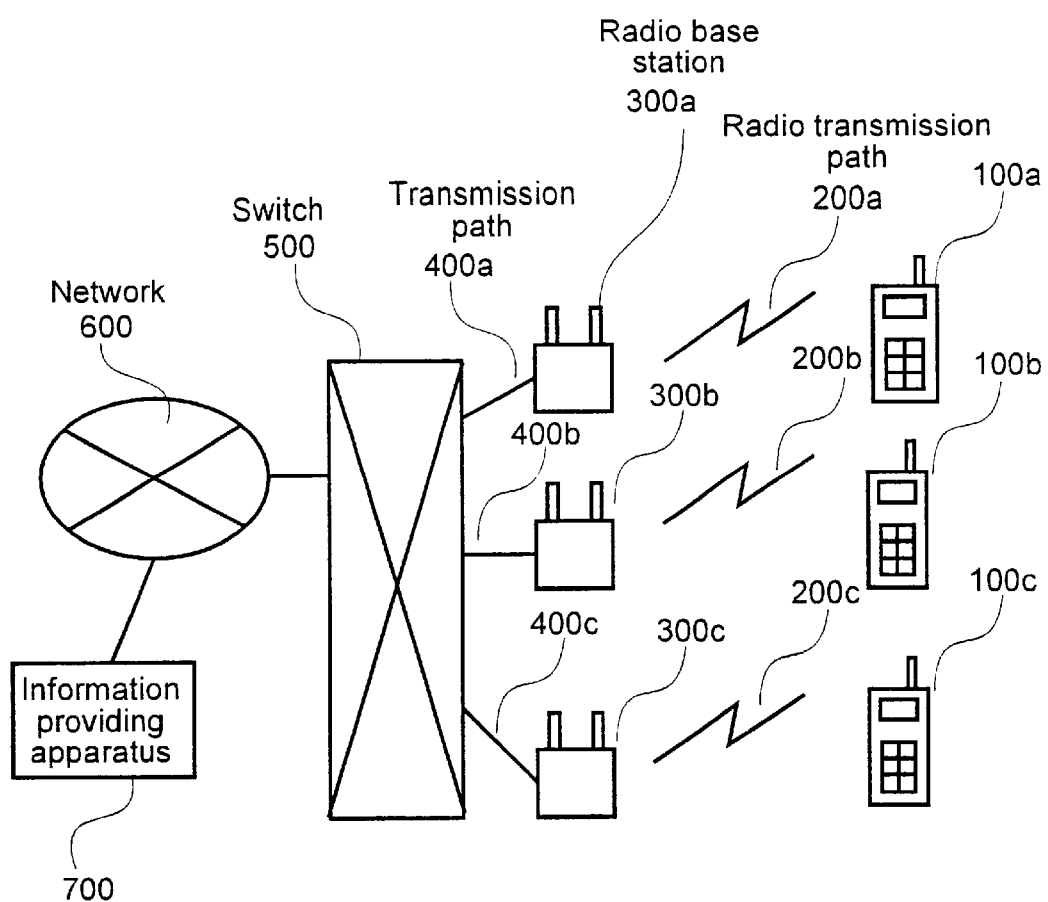
FIG. 1 is a diagram showing the configuration of a radio-communication system to which the present invention is applied.

In the following description, an embodiment of the present invention is exemplified by a PHS (Personal Handyphone System). It should be noted that, however, that the description is not intended to limit the scope of the present invention to a PHS. That is, the present invention can also be applied to, among others, a variety of radio-communication terminals and radio-communication systems such as portable telephones and PDAs (Personal Digital Assistants). As a radio-communication system, the cellular system, the CDMA (Code Division Multiple Access) system or the like can be adopted. As a CDMA system, it is possible to properly adopt a narrow-band CDMA (N-CDMA) or a wide-band CDMA (W-CDMA) taking a future radio-communication system into consideration. An example of the future radio-communication system is the IMT 2000 (International Mobile Telecommunication 2000). In addition, the present invention can be applied not only to the mobile-communication, but also to a radio-communication system of any type including a stationary station.

In the following description, the PHS system is taken as an example as mentioned above.

In the PHS system, typically, a USCCH (User Specific Control Channel) is selected among control channels as a control channel for exchanging information. This channel is defined as an optional channel that can be set arbitrarily by trade associations in the second-generation cordless telephone system such as the RCR STD. It should be noted that a proper control channel can also be used as the USCCH. In addition, in a radio-communication control system other than the PHS system, the present invention can be applied by adopting a proper control channel. By using such a control channel, contentions with conversations for a channel can be eliminated so that services to provide information can be rendered without affecting conversation services which are the natural services of the PHS system.

Page 7

In addition, a minimum area that can be recognized by the radio-communication system is used as a location-registration area in the present invention. Furthermore, deliveries of presentation information are triggered by acceptance of a request for a location-registration made by a radio-communication terminal, a request accepted by the radio-communication system such as a radio base station or a switch. Thus, the user of a radio-communication terminal is capable of obtaining presentation information peculiar to its location-registration area without carrying out specific operations of the radio-communication terminal or being aware of existence of specific presentation information. By using a request for a location registration as a means for triggering deliveries of presentation information, services for rendering such information can be automated. As a result, the information provider which provides commercial information such as advertisements for an area as presentation information is capable of distributing the information to users of radio-communication terminals in the area without missing registered users. It should be noted that the radio-communication terminal may also transmit an identification signal to the radio-communication system as a proper triggering means. In this case, however, the effect of the automation described above can not be reaped. Such a radio-communication system can be regarded as a system which rather gives consideration to the awareness of the user of the radio-communication terminal before the information provider.

FIG. 1 is a diagram showing a typical configuration of a radio-communication system to which the presentation is applied. As shown in the figure, the typical configuration comprises a plurality of radio-communication terminals 100a to 100c, a plurality of radio base stations 300a to 300c, a switch 500, an information providing apparatus 700 and a network 600. The radio-communication base stations 300a to 300c each accommodate the radio-communication terminals 100a to 100c existing in a radio-communication zone through radio-transmission paths 200a to 200c associated with the radio-communication base stations 300a to 300c respectively. The radio-communication base stations 300a to 300c are connected to the switch 500 by transmission paths 400a to 400c respectively. The switch 500 is connected to the network 600 to which the information providing apparatus 700 is connected.

Figure 2:
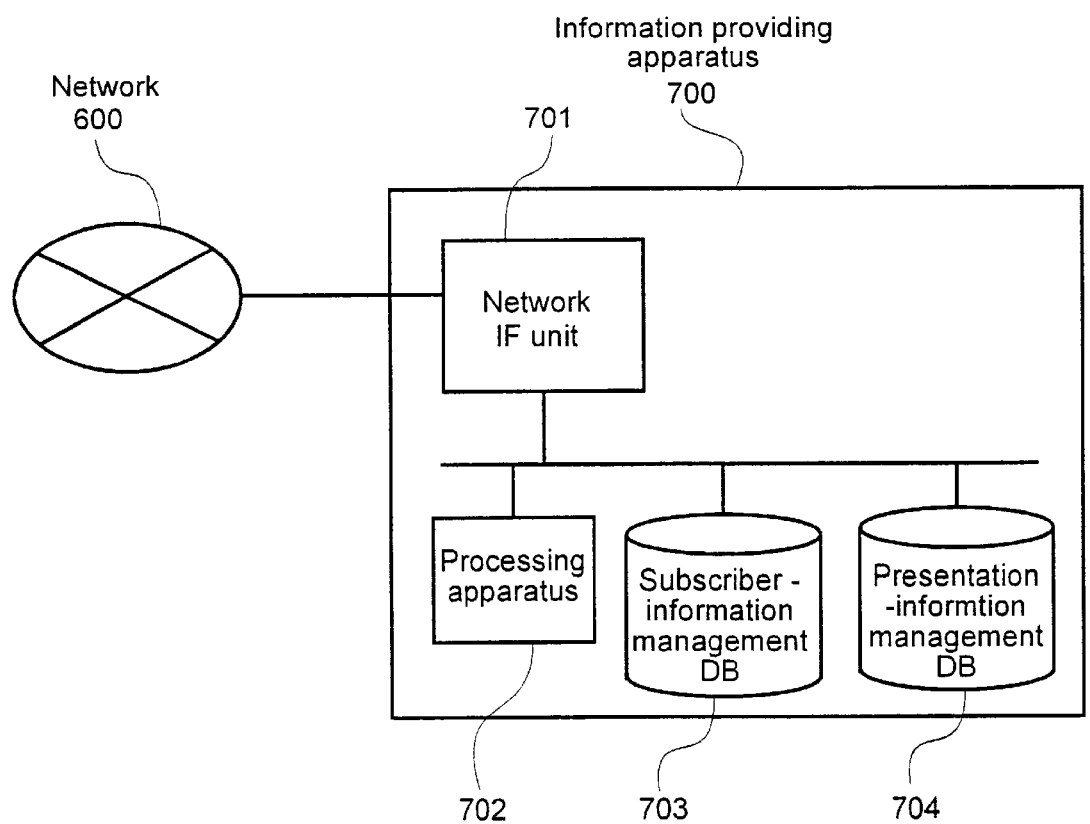
FIG. 2 is a diagram showing the configuration of an information providing apparatus employed in the radio-communication system to which the present invention is applied.

FIG. 2 is a diagram showing a typical configuration of the information providing apparatus 700 employed in the radio-communication system to which the present invention is applied. As shown in the figure, the information providing apparatus 700 typically comprises a network interface unit 701, a presentation-information processing unit 702, a subscriber-information management DB 703 and a presentation-information management DB 704.

Connected to the network 600, the switch 500 and other apparatuses, the network interface unit 701 employed in the presentation-processing apparatus 700 serves as an interface for transmitting and receiving signals to and from the network 600, the switch 500 and the other apparatuses. The subscriber-information management DB 703 includes data of subscribers such as the ages and the gender of the subscribers, data for selecting presentation information desired by a subscriber and data for modifying presentation information in accordance with a smallest unit area in which the location of a radio-communication can be recognized. A smallest unit area is explained as follows.

For example, the radio-communication system adopts the concept of a location-registration area to serve as an area for controlling positions of radio-communication terminals in order to allow a specific radio-communication terminal to be called. Thus, operations can be carried out with the location-registration area used as the smallest unit area. It should be noted that a location-registration area is provided in order to allow radio-communication resources to be utilized effectively when a specific radio -communication terminal is called. That is, an area which is normally covered by 10 to 30 radio-base stations is operated as a location-registration area. It is worth noting, however, that the number of radio base stations composing a location-registration area varies in dependence of how the radio-communication system is designed. The number of such radio base stations may be only one in some cases. In addition, by operating the radio-communication system in such a way that the position of a radio-communication terminal is recognized each time a radio-communication terminal moves from area covered by a radio base station to an area covered by another radio base station, a smallest unit area is covered by a radio base station.

Presentation information stored in the presentation-information management DB 704 can be changed and new information can be added thereto. The presentation-information processing unit 702 reads out conditions of transmission such as the age and the gender of a subscriber from the subscriber-information management DB 703 by searching the DB 703 for data of the subscriber using information on a location-registration area in which the radio-communication terminals 100a to 100c are located. The presentation-information processing unit 702 further carries out processing to inform subscribers using the radio-communication terminals 100a to 100c of presentation information which is suitable for the subscribers and read out from the presentation-information management DB 704 by using, among other things, conditions of transmission for the subscribers and the information on the location-registration area. Besides this processing to inform subscribers of presentation information, the presentation-information processing unit 702 also carries out processing to modify subscriber information in accordance with operations carried out by a subscriber on a radio-communication terminal or an apparatus outside the radio-communication system. In addition, the presentation-information processing unit 702 also carries out processing to store an amount of money prepaid by a subscriber in advance and subtract a fee of providing information to the subscriber from the amount of money left in a so-called prepaid-system calculation.

FIG. 3 is an explanatory diagram showing a typical structure of the subscriber-information management DB 703. As shown in the figure, the subscriber-information management DB 703 comprises first and second data tables denoted by reference numerals 705 and 706 respectively.

The first data table 705 shown in FIG. 3A includes 3 different types of data, namely, a terminal ID or a terminal identification number, a subscriber name and a subscriber-information request ID indicating whether or not the subscriber is to be requested to transmit subscriber-information used for selecting presentation information. To be more specific, a subscriber-information request ID of 0 indicates that the subscriber is not to be requested to transmit subscriber information used for selecting presentation information while a subscriber-information request ID of 1 indicates that the subscriber is to be requested to transmit subscriber information. On the other hand, the second data table 706 shown in FIG. 3B includes 2 types of information, namely, a subscriber name and subscriber data. The subscriber data typically includes the age, the gender and the occupation of a subscriber, requested information, an information providing fee, a counter and a subscriber ID. The requested information is a data field which is used for storing the number of subscriber information which is received from a subscriber when the subscriber-information request ID of the first data table 705 is found to have a value of 1 to indicate that the subscriber is requested to transmit the subscriber information as described above. The counter indicates the number of times the subscriber has utilized the information presentation service as an individual transaction. Each time a row of the second data table 706 is searched, the contents of the counter of the row is incremented. The subscriber ID is typically derived from pieces of data relevant to the subscriber. The first and second digits of the subscriber ID represent the first and second high-order digits of the age of the subscriber. The third digit of the subscriber ID indicates the gender of the user. A gender digit of 0 indicates a male subscriber while a gender digit of 1 indicates a female subscriber. The fourth and fifth digits of the subscriber ID represent the first and second high-order digits of the occupation of the subscriber. The sixth and seventh digits of the subscriber ID are the number of the requested information.

FIG. 4 is an explanatory diagram showing a typical structure of the presentation information management DB 704. As shown in the figure, the presentation-information management DB 704 comprises third and fourth data tables denoted by reference numerals 707 and 708 respectively.

The third data table 707 shown in FIG. 4A includes 4 types of data, namely, a subscriber ID, a location-registration-area number or information on a location-registration area cited earlier, a calendar ID and a presentation-information ID for identifying information to be presented. The calendar ID is information for determining a time such as a day of the week, a date and a time or a period of time on a day at which presentation information is to be delivered. Typically, the calendar ID is determined in accordance with the desire of the subscriber described in a contract made with a subscriber. For example, if presentation information is to be provided daily, the calendar ID is set at a typical value of 00. If presentation information is to be provided every Monday, Tuesday, Wednesday, Thursday, Friday, Saturday or Sunday, the calendar ID is set at a typical value of 01, 02, 03, 04, 05, 06 and 07 respectively. If presentation information is to be provided every weekend, that is, every Friday, Saturday and Sunday, the calendar ID is set at a typical value of 10. If presentation information is to be provided every weekdays, that is, every Monday, Tuesday, Wednesday and Thursday, the calendar ID is set at a typical value of 11. Typically, the 7 high-order bits of the presentation-information ID are the subscriber ID, and the eighth to tenth bits of the presentation-information ID are the location-registration-area number. The eleventh and twelfth bits of the presentation-information ID are the calendar ID. The fourth data table 708 shown in FIG. 4B includes 3 types of data, namely, a presentation-information ID, a counter and presentation information. The presentation information comprises appended information, information details and a fee. Appended information and its utilization will be described later. Information details include various kinds of information. Examples of information details can be typically a warning, information on rentals of video discs, CDs or others, information on department stores, information on restaurants and information on stocks. The counter indicates a number of times the information details have been accessed so far. Each time an access is made to a row of the fourth data table 708, a counter of the row in the table 708 is incremented. The fee is an amount of money to be charged to a subscriber for a case such as fee-charging presentation information or an existing service point.

The contents of the subscriber-information management DB 703 and the presentation-information management DB 704 are in essence requested information selected properly by the subscriber when a contract is made with the information provider and can be changed later. As an alternative, the contents of the subscriber-information management DB 703 and the presentation-information management DB 704 are properly selected by an information provider and include subscribers desiring information provided by the information provider itself as presentation information as well as location-registration areas. In addition, a terminal ID included in the subscriber-information management DB 703 is determined in advance in accordance with conditions of presentation information.

Figure 5:
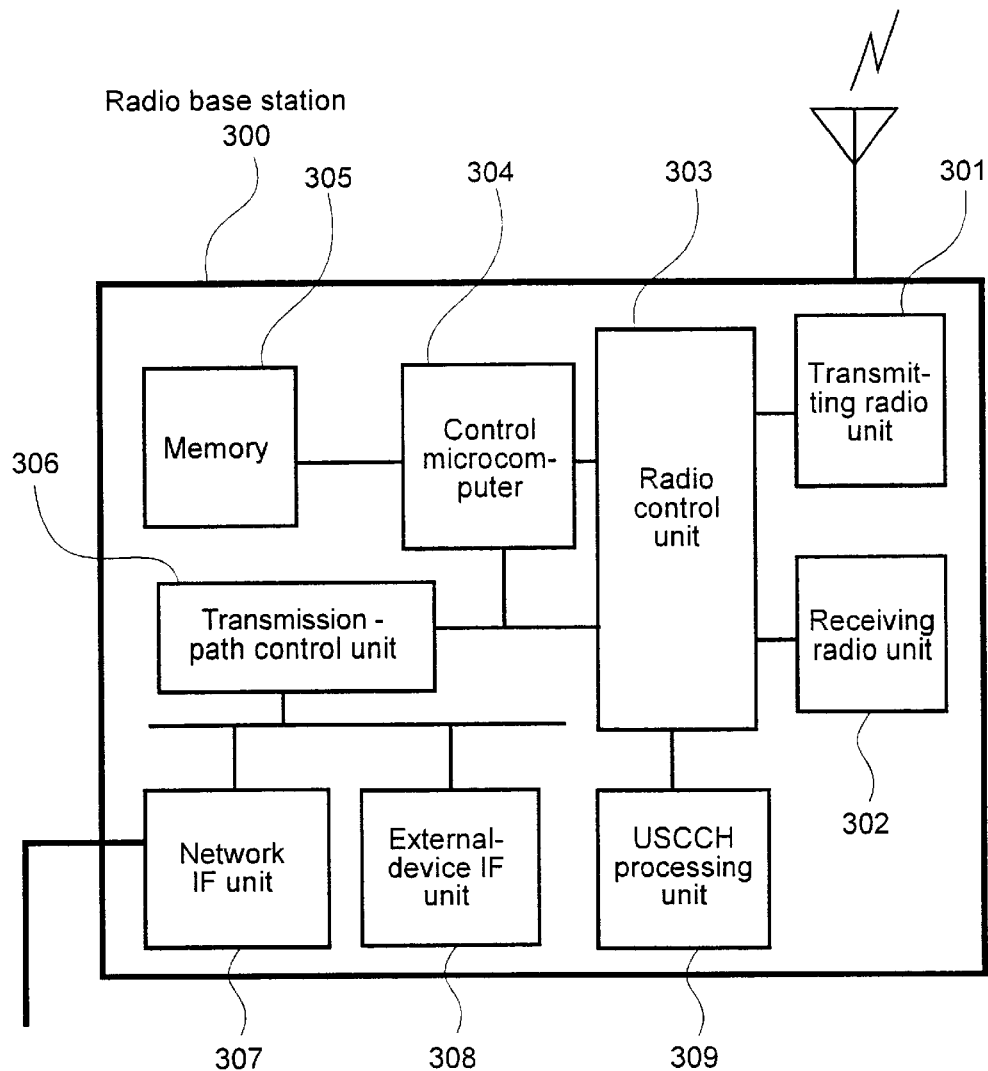
FIG. 5 is a diagram showing the configuration of a radio base station employed in the radio-communication system to which the present invention is applied.

FIG. 5 is a diagram showing a typical configuration of the radio base station 300 employed in the radio-communication system to which the present invention is applied. As shown in the figure, the radio base station 300 comprises a transmitting radio unit 301, a receiving radio unit 302, a radio control unit 303, a control microcomputer 304, a memory 305, a transmission-path control unit 306, a network interface unit 307, an external-device interface unit 308 and a USCC processing unit 309.

Controlled by the radio control unit 303, the transmitting radio unit 301 and the receiving radio unit 302 respectively transmit and receive signals to and from a radio-communication terminal 100. Provided with the memory 305, the control microcomputer 304 controls the radio base station 300 as a whole. The transmission-path control unit 306 controls transfers of data between the network interface unit 307 as well as the external-device interface unit 306 and the radio control unit 303 or the control microcomputer 304. As will be described later, the network interface unit 307 and the external-device interface unit 308 allow the radio base station 300 to be connected to external devices such as the switch 500, the network 600 and the information providing apparatus 700. The USCCH processing unit 309 processes notices of requests for subscriber information and presentation information to be transmitted using the USCCH channel to the radio-communication terminals 100*a* to 100*c*. In addition, the USCCH processing unit 309 also processes information on subscribers transmitted by the radio-communication terminals 100*a* to 100*c* through the USCCH channel by operations carried out by subscribers. It should be noted that the present invention can also be applied to a radio-communication system using a control channel other than the USCCH channel. In this case, the USCCH processing unit 309 functions as a control-channel processing unit.

Figure 6:
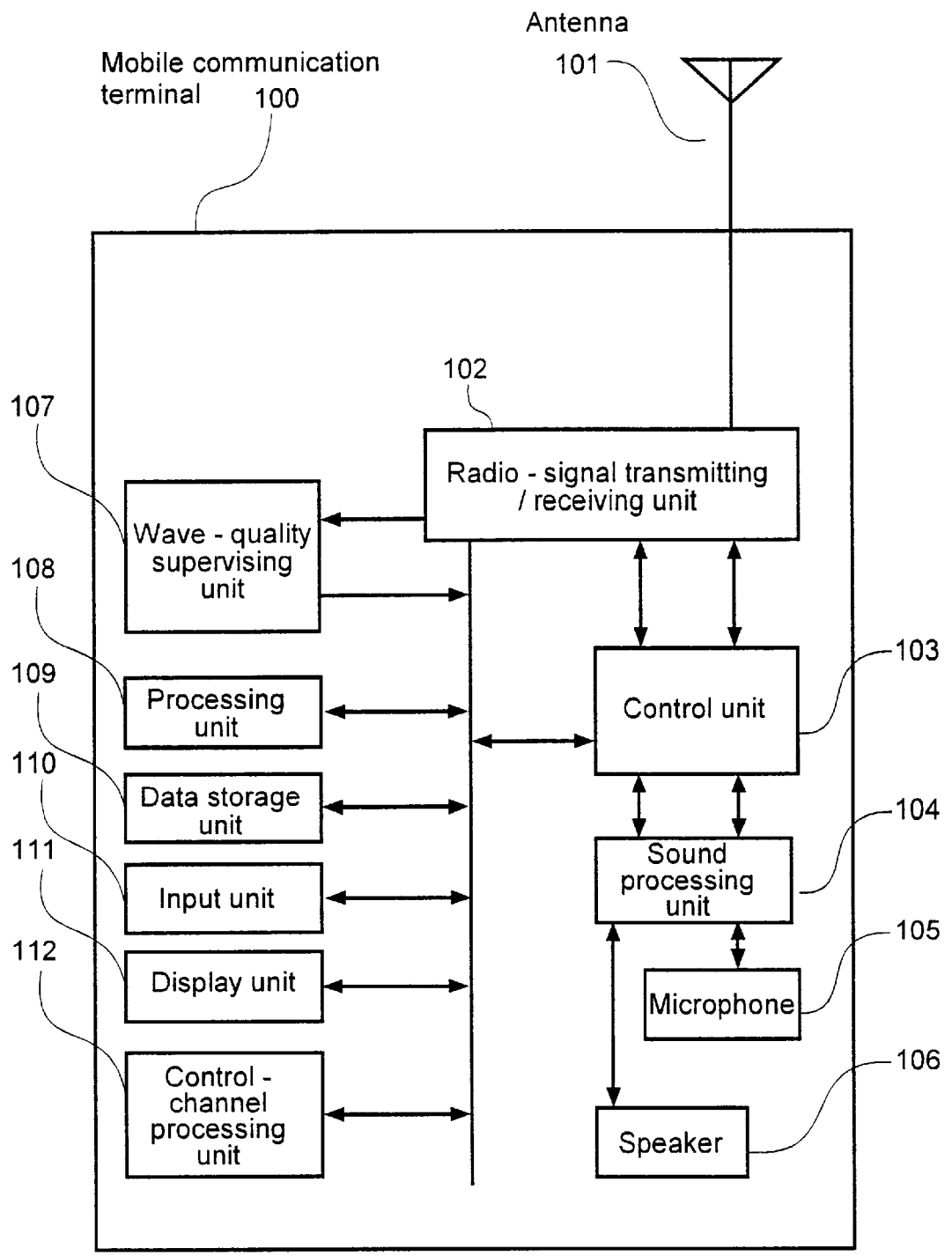
FIG. 6 is a diagram showing the configuration of a radio-communication terminal employed in the radio-communication system to which the present invention is applied.

FIG. 6 is a diagram showing a typical configuration of the radio-communication terminal 100 employed in the radio-communication system to which the present invention is applied. As shown in the figure, the radio-communication terminal 100 comprises an antenna 101, a radio-signal transmitting/receiving unit 102, a control unit 103, a sound processing unit 104, amicrophone 105, a speaker 106, a radio quality detector 107, a processing unit 108, a data storage unit 109, an input unit 110, a display unit 111 and a control-channel processing unit 112.

Controlled by the control unit 103, the radio-signal transmitting/receiving unit 102 transmits and receives radio signals to and from the radio base station 300 through the antenna 101. The control unit 103 controls the radio-communication terminal 100 as a whole. The sound processing unit 104 interfaces with the microphone 105, the speaker 106 and the control unit 103. The radio quality detector 107 monitors the quality of a wave received from the radio base station 300 in communication. A result of the monitoring is used as a basis of a judgment formed when switching the radio zone in which the radio-communication terminal 100 exists from one to another. The input unit 110 is a means for inputting various kinds of information such as a keyboard or a touch panel. The display unit 111 is one of a variety display units such as a liquid-crystal display device. Typically, the display unit 111 displays presentation information received from the radio-communication system through a control channel. The processing unit 108 carries out various kinds of processing based on control information such as that of the USCCH channel. The data storage unit 109 is used for storing various kinds of data such as the terminal identification (terminal ID) and the information on the position. The control-channel processing unit 112 displays presentation information received from the radio-communication system through a control channel such as the USCCH channel, and processes a notification of a request for subscriber information. In addition, the control-channel processing unit 112 transmits subscriber information for selecting presentation information to be transmitted by using a control channel such as the USCCH channel. The subscriber information is entered to the radio-communication terminal 100 by the subscriber through operations carried out on the input unit 110. It should be noted that, while the USCCH channel is used as a control channel in the description of the embodiment, another control channel can also be used in dependence on the radio-communication system.

Figure 7:
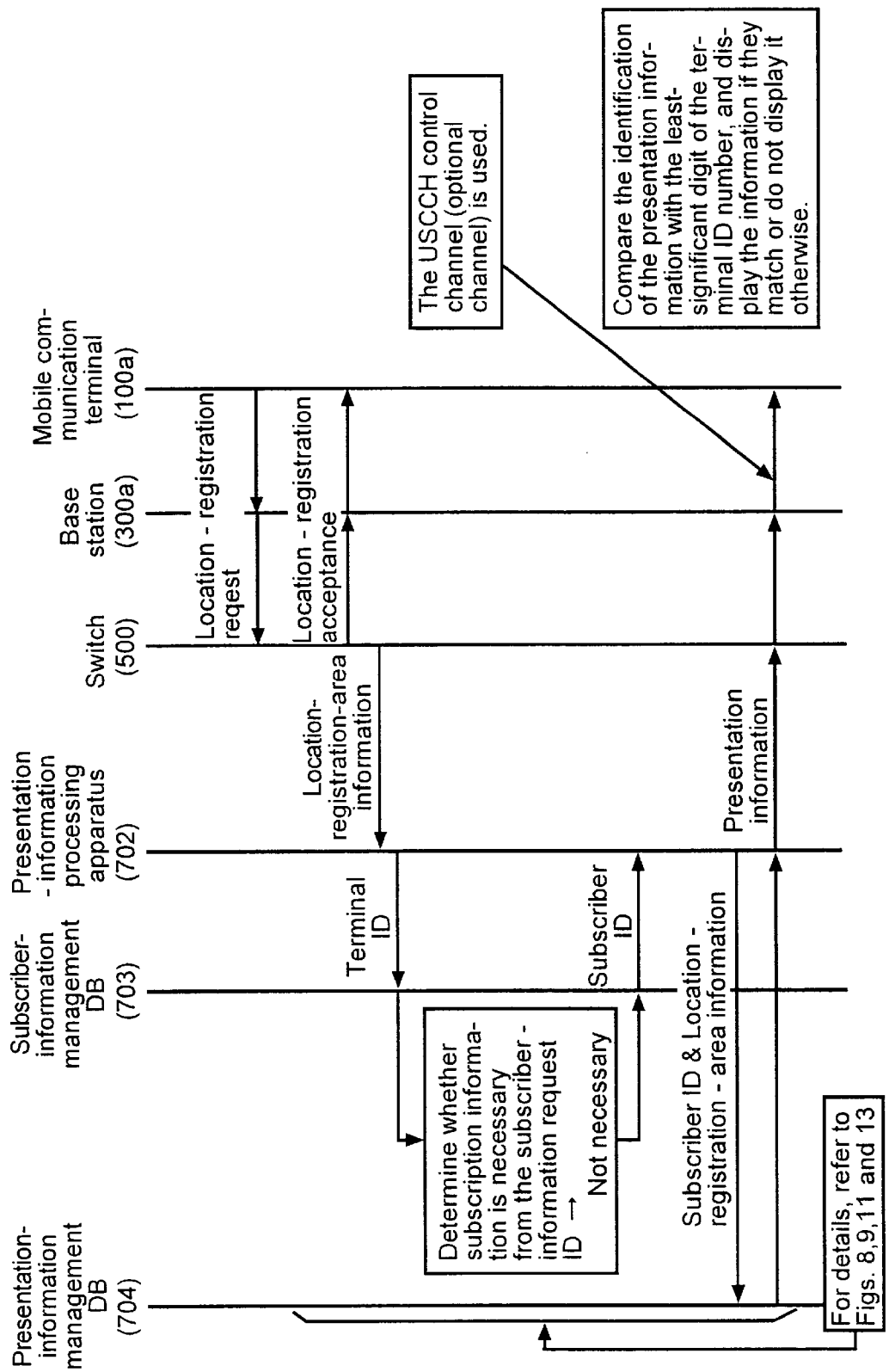
FIG. 7 is a diagram showing a sequence of an outline of processing to communicate presentation information in the radio-communication system to which the present invention is applied.
Figure 8:
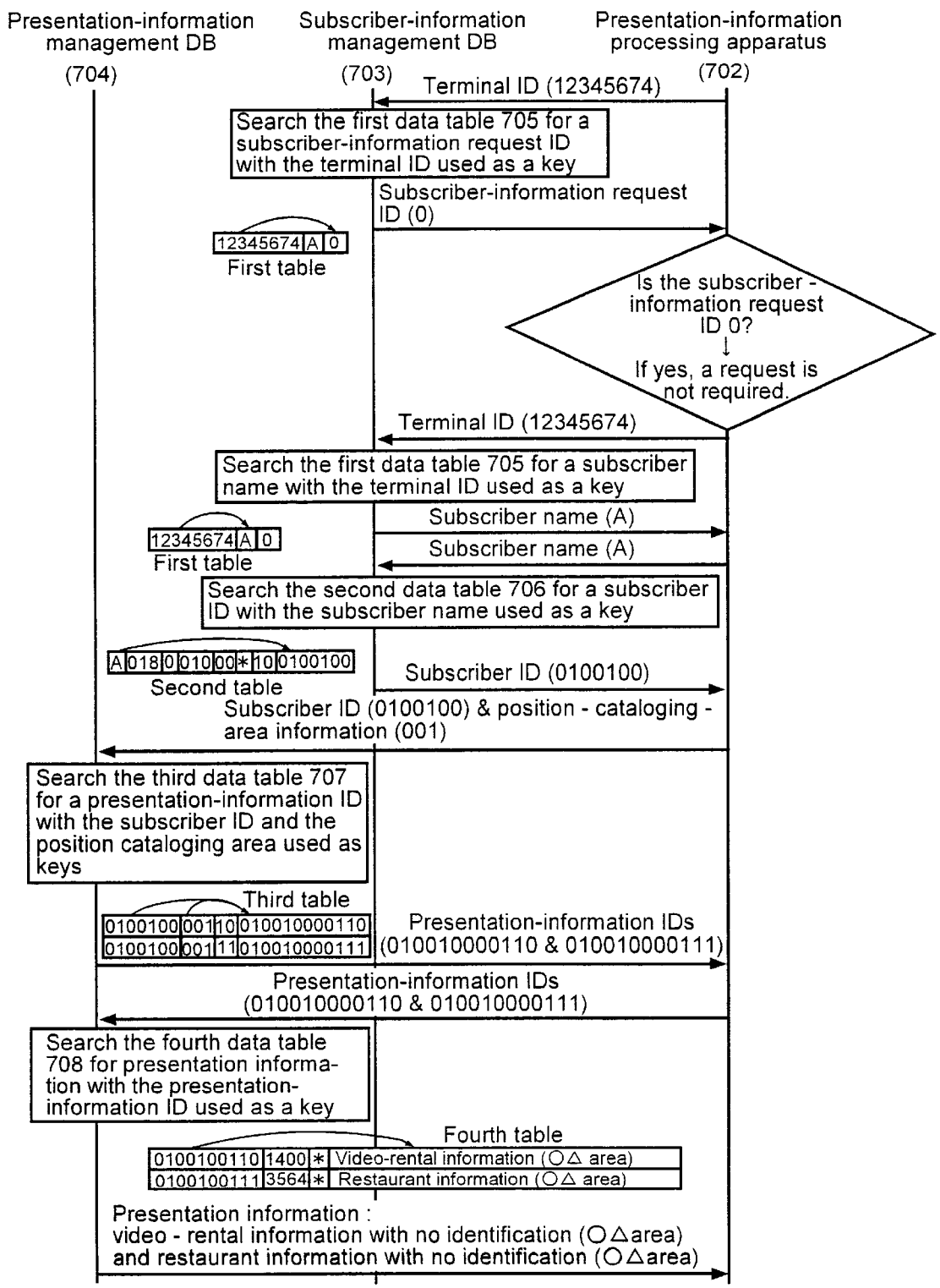
FIG. 8 is a diagram showing a sequence of an outline of processing carried out by the information providing apparatus to communicate presentation information.

FIG. 7 is a diagram showing a typical sequence of an outline of processing to communicate presentation information in the radio-communication system to which the present invention is applied. FIG. 8 is a diagram showing a typical sequence of an outline of processing carried out by the information providing apparatus 700 to communicate presentation information. They are sequences to provide information to the radio-communication terminal 100*a* when the switch 500 receives a request for a location registration from the radio-communication terminal 100*a* in a typical PHS system.

Assume that a user A, who has made a contract to receive video-rental information as presentation information, enters an area ○A with a location registration-area number of 001. It should be noted that the information providing apparatus 700 does not specially take a calendar ID into consideration in the following description. When the user A enters the area ○A with a location-registration-area number of 001, the radio-communication terminal 100*a* carried by the user A transmits a request for a location registration to the switch 500 by way of the radio base station 300*a*. Receiving the request, the switch 500 determines whether the location registration is found possible or not. If the location registration is found possible, the switch 500 informs the radio-communication terminal 100a that the request for the location registration has been accepted. Since the request for the location registration is accepted, the switch 500 transmits information on the location-registration area in which the user A exists, that is, the area ○△ with a location-registration-area number of 001, and the terminal ID "12345674" of the radio-communication terminal 100a to the presentation-information processing unit 702 employed in the information providing apparatus 700.

Receiving these pieces of information, the presentation-information processing unit 702 first of all searches the first data table 705 of the subscriber-information management DB 703 for a subscriber-information request ID by using the terminal ID "12345674" as a key. For the terminal ID "12345674", the subscriber-information request ID is found to be 0 which indicates that the subscriber is not to be requested to transmit subscriber information used for selecting presentation information. Thus, the presentation-information processing unit 702 then searches the first data table 705 for a subscriber name by using the terminal ID "12345674" as a key. For the terminal ID "12345674", the subscriber name is found to be "A". Then, the presentation-information processing unit 702 searches the second data table 706 of the subscriber-information management DB 703 for a subscriber ID by using the subscriber name "A" as a key. For the subscriber name "A", the subscriber ID is found to be "0100100". Then, the presentation-information processing unit 702 searches the third data table 707 of the presentation-information management DB 704 for presentation-information IDs by using the subscriber ID "0100100" and the information on the location-registration area, that is, the location-registration-area number 001 received from the switch 500, as a pair of keys. For the pair of keys, the presentation-information IDs are found to be "010010000110" and "010010000111". Then, the presentation-information processing unit 702 searches the fourth data table 708 of the presentation-information management DB 704 for presentation information by using the presentation-information IDs "010010000110" and "010010000111" as keys. The pieces of presentation information for the presentation-information IDs "010010000110" and "010010000111" are found to be information on video rentals (of the ○△ area) and information on restaurants (of the ○△ area) respectively which are then transmitted to the radio-communication terminal 100a by way of the switch 500 and the radio base station 300a through the USCCH channel. The radio-communication terminal 100a finally displays the pieces of presentation information on the display unit 111.

Figure 9:
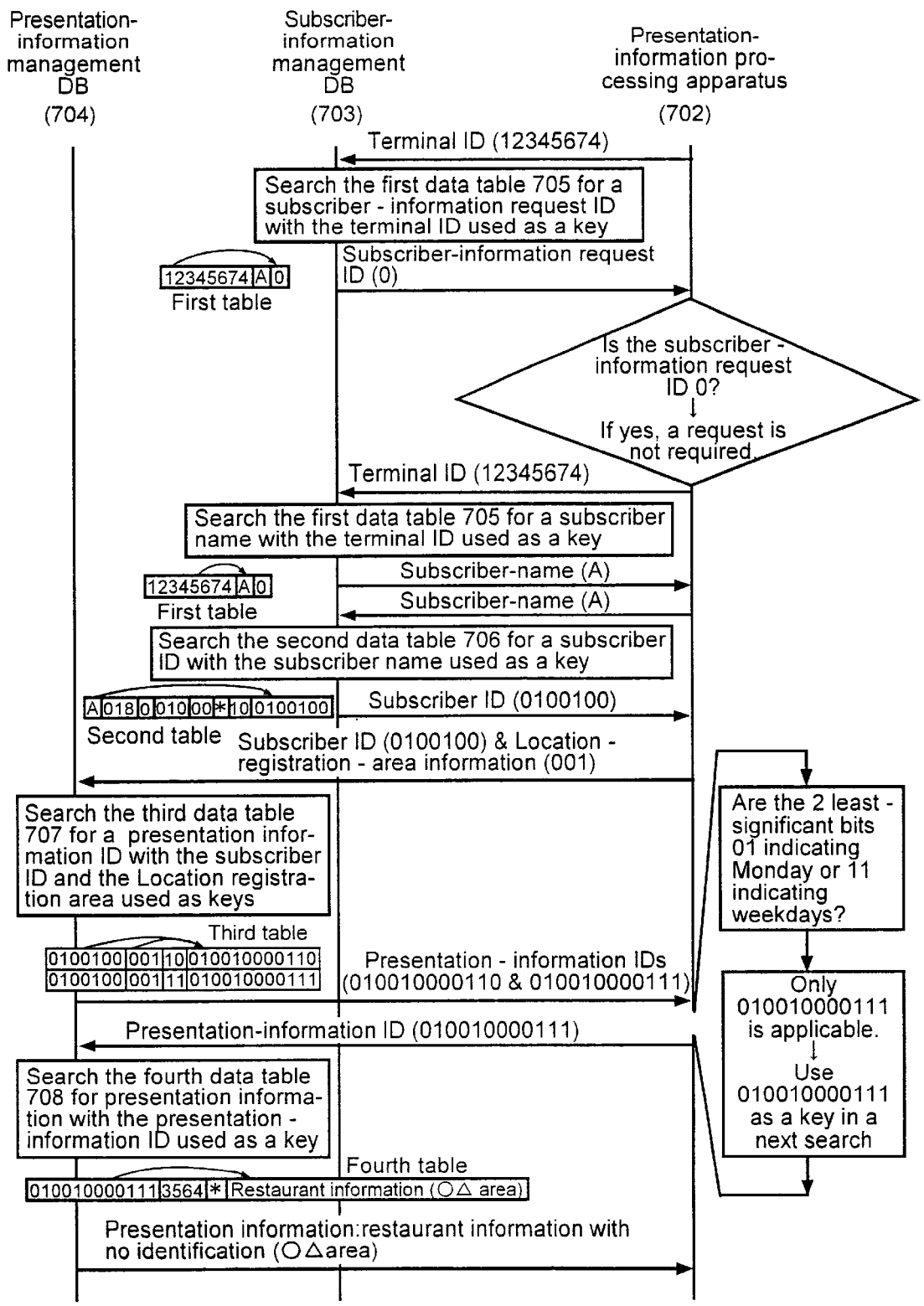
FIG. 9 is a diagram showing a sequence of an outline of processing carried out by the information providing apparatus to communicate presentation information in accordance with calendar information.

FIG. 9 is a diagram showing a sequence of an outline of processing carried out by the information providing apparatus 700 to communicate presentation information in accordance with calendar information in relation to the typical sequence shown in FIG. 7. As an example, presentation information is changed in accordance with a day of the week.

Assume that, according to a contract made by a user A with an information provider Y, the user A desires that information on video rentals (of the ○△ area) be provided every weekend only as indicated by a calendar ID of 10. On the other hand, according to a contract made by the user A with an information provider Z, the user A desires that information on restaurants (of the ○△ area) be provided every weekdays only as indicated by a calendar ID of 11. When the user A enters the ○△ area having a location-registration-area number of 001 on Monday, a request for a location registration is transmitted from the radio-communication terminal 100a owned by the user A to the switch 500 by way of the radio base station 300a.

Receiving the request, the switch 500 determines whether the location registration is possible or not. If the location registration is found possible, the switch 500 informs the radio-communication terminal 100a that the request for the location registration has been accepted. Since the request for the location registration is accepted, the switch 500 transmits information on the location-registration area in which the user A exists, that is, the area ○△ with a location-registration-area number of 001, the terminal ID "12345674" of the radio-communication terminal 100a to the presentation-information processing unit 702 employed in the information providing apparatus 700.

Receiving these pieces of information, the presentation-information processing unit 702 first of all searches the first data table 705 of the subscriber-information management DB 703 for a subscriber-information request ID by using the terminal ID "12345674" as a key. For the terminal ID "12345674", the subscriber-information request ID is found to be 0 which indicates that the subscriber is not to be requested to transmit subscriber information used for selecting presentation information. Thus, the presentation-information processing unit 702 then searches the first data table 705 for a subscriber name by using the terminal ID "12345674" as a key. For the terminal ID "12345674", the subscriber name is found to be "A". Then, the presentation-information processing unit 702 searches the second data table 706 of the subscriber-information management DB 703 for a subscriber ID by using the subscriber name "A" as a key. For the subscriber name "A", the subscriber ID is found to be "0100100". Then, the presentation-information processing unit 702 searches the third data table 707 of the presentation-information management DB 704 for presentation-information IDs by using the subscriber ID "0100100" and the information on the location-registration area, that is, the location-registration-area number 001 received from the switch 500, as a pair of keys. For the pair of keys, the presentation-information IDs are found to be "010010000110" and "010010000111". Then, the presentation-information processing unit 702 searches the fourth data table 708 of the presentation-information management DB 704 for presentation information by using the presentation-information IDs "010010000110" and "010010000111" as keys. The 2 least-significant bits of each of these presentation-information IDs are a calendar ID. The 2 least-significant bits of the presentation-information ID "010010000110" are "10" which indicates a weekend. Since today is Monday, the presentation-information processing apparatus 702 determines that the presentation-information ID "010010000110" is not applicable. On the other hand, since the 2 least-significant bits of the presentation-information ID "010010000111" are "11" which indicates weekdays, the presentation-information processing apparatus 702 determines that the presentation-information ID "010010000111" is applicable. Then, the presentation-information processing unit 702 searches the fourth data table 708 of the presentation-information management DB 704 for presentation information by using the presentation-information ID "010010000111" as a key. The presentation information for the presentation-information ID "010010000111" is found to be information on restaurants (for the ○△ area) which is then transmitted to the radio-communication terminal 100a by way of the switch 500 and the radio base station 300a through the USCCH channel. The radio-communication terminal 100a finally displays the information on restaurants on the display unit 111.

The calendar ID of the third data table 707 of the presentation-information management DB 704 may include start and end times besides days of the week. In this case, times on a day to provide information can also be specified. That is, a period of time from a start time to an end time can be specified.

Figure 10:
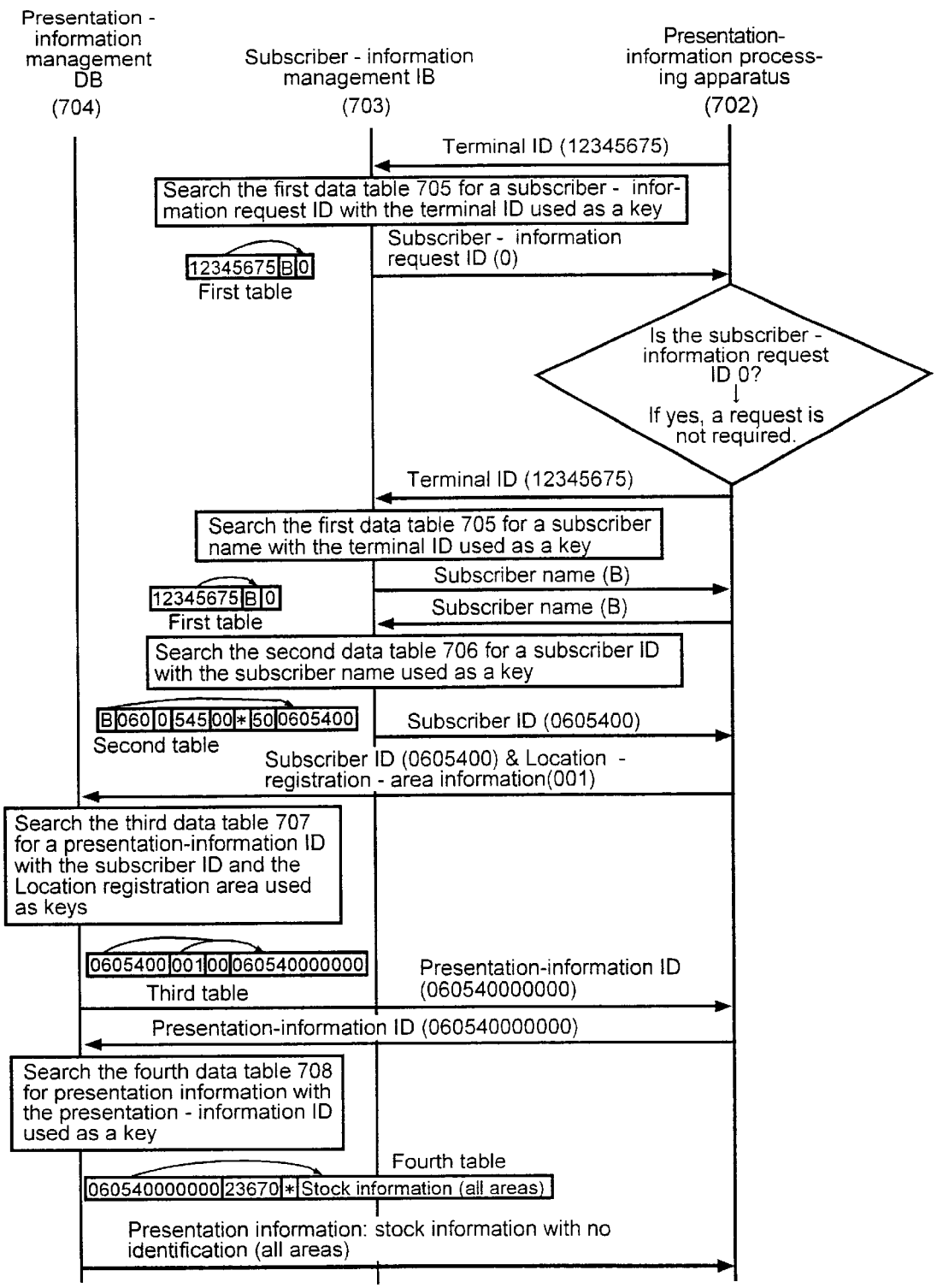
FIG. 10 is a diagram showing a sequence of an outline of processing carried out by the information providing apparatus to broadcast the same information to a plurality of areas.

FIG. 10 is a diagram showing a typical sequence of an outline of processing carried out by the information providing apparatus 700 to broadcast the same information to a plurality of areas in relation to the typical sequence shown in FIG. 7. It should be noted that the information providing apparatus 700 does not specially take a calendar ID into consideration in the following description.

As shown in the third data table 707 of FIG. 4, a user B with a subscriber ID of "0605400" desires that presentation information of the same type, that is, information on stocks for all areas with location-registration-area numbers of 001, 002 to 099 be provided in accordance with a contract made with the information provider. Assume that the user B enters the ○Δ area having a location-registration-area numbers of 001. When the user B enters the area ○Δ, the radio-communication terminal 100*b* carried by the user B transmits a request for a location registration to the switch 500 by way of the radio base station 300*a*. Receiving the request, the switch 500 determines whether the location registration is possible or not. If the location registration is found possible, the switch 500 informs the radio-communication terminal 100*b* that the request for the location registration has been accepted. Since the request for the location registration is accepted, the switch 500 transmits information on the location-registration area in which the user B exists, that is, the area ○Δ with a location-registration-area number of 001, and the terminal ID "12345675" of the radio-communication terminal 100*b* to the presentation information processing unit 702 employed in the information providing apparatus 700.

Receiving these pieces of information, the presentation-information processing unit 702 first of all searches the first data table 705 of the subscriber-information management DB 703 for a subscriber-information request ID by using the terminal ID "12345675" as a key. For the terminal ID "12345675", the subscriber-information request ID is found to be 0 which indicates that the subscriber is not to be requested to transmit subscriber information used for selecting presentation information. Thus, the presentation-information processing unit 702 then searches the first data table 705 for a subscriber name by using the terminal ID "12345675" as a key. For the terminal ID "12345675", the subscriber name is found to be "B". Then, the presentation-information processing unit 702 searches the second data table 706 of the subscriber-information management DB 703 for a subscriber ID by using the subscriber name "B" as a key. For the subscriber name "B", the subscriber ID is found to be "0605400". Then, the presentation-information processing unit 702 searches the third data table 707 of the presentation-information management DB 704 for presentation-information IDs by using the subscriber ID "0605400" and the information on the location-registration area, that is, the location-registration-area number 001 received from the switch 500, as a pair of keys. For the pair of keys, the presentation-information ID is found to be "060540000000". Then, the presentation-information processing unit 702 searches the fourth data table 708 of the presentation-information management DB 704 for presentation information by using the presentation-information ID "060540000000" as a key. The presentation information for the presentation-information ID "060540000000" is found to be information on stocks (for all areas) which is then transmitted to the radio-communication terminal 100*b* by way of the switch 500 and the radio base station 300*a* through the USCCH channel. The radio-communication terminal 100*b* finally displays the information on stocks on the display unit 111. By the same token, when the user B enters any of the location-registration areas with location-registration-area numbers of 002 to 099, the information on stocks is displayed.

The following description explains a case in which presentation information is provided to a plurality of radio-communication terminals 100*a* to 100*c* at the same time for any plurality of location-registration areas. It should be noted that the information providing apparatus 700 does not specially take a calendar ID into consideration in the following description. First of all, assume a case in which there is a request for distribution of information with a presentation-information ID of 200003000000 at the same time by an information provider of a food/drink supplier X in location-registration areas with location-registration-area numbers of 001 to 010. In this case, for all location-registration-area numbers of 001 to 010 in the third data table 707 of the presentation-information management DB 704, a presentation-information ID of 200003000000 is cataloged in advance. In this way, when a subscriber with no requested information cataloged specially or a subscriber desiring information on restaurants as requested information enters any of the location-registration areas with location-registration-area numbers of 001 to 010, the information with a presentation-information ID of 200003000000 is transmitted.

Figure 11:
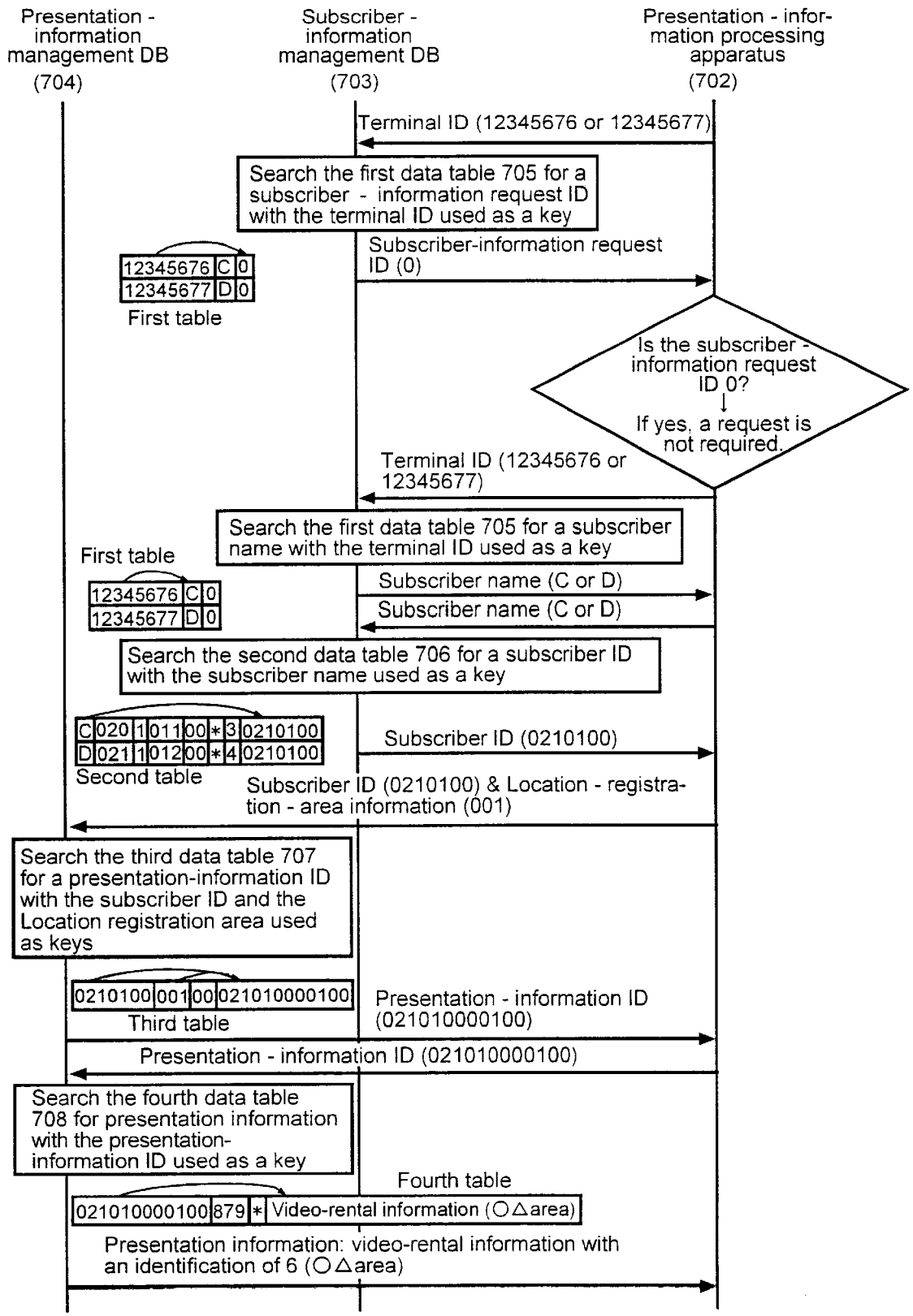
FIG. 11 is a diagram showing a sequence of an outline of processing carried out by the information providing apparatus to display presentation information when a terminal ID matches an identification.

FIG. 11 is a diagram showing a sequence of an outline of processing carried out by the information providing apparatus 700 to display presentation information when a terminal ID matches an identification in relation to the typical sequence shown in FIG. 7. In this case, an identification for identifying a radio-communication terminal is appended to presentation information to be transmitted. In this sequence, when a radio-communication terminal receives this presentation information, the identification appended to the information is compared with the least-significant digit of the terminal ID of the radio-communication terminal. If the identification matches the least-significant digit of the terminal ID, the presentation information is displayed. Otherwise, the presentation information is not displayed. It should be noted that the information providing apparatus 700 does not specially take a calendar ID into consideration in the following description.

An identification for identifying a radio-communication terminal is appended to the header of presentation information stored in the presentation-information management DB 708 in advance. In this example, the identification is a digit with a value of "6". Assume that a contract made by a user C with the information provider indicates that information on video rentals be provided to the user C as presentation information while a user D does not desire information on video rentals to be provided as presentation information. Let the users C and D enter an ○Δ area with a location-registration-area number of 001. When the users C and D enter the ○Δ area, the radio-communication terminal 100*c* carried by the user C transmits a request for a location-registration to the switch 500 by way of the radio base station 300*a*. Receiving the request, the switch 500 determines whether the location registration is possible or not. If the location registration is found possible, the switch 500 informs the radio-communication terminal 100*c* that the request for the location registration has been accepted. Since the request for the location registration is accepted, the switch 500 transmits information on the location-registration area in which the user C exists, that is, the area ○△ with a location-registration-area number of 001, and the terminal ID "12345676" of the radio-communication terminal 100c to the presentation-information processing unit 702 employed in the information providing apparatus 700.

Receiving these pieces of information, the presentation-information processing unit 702 first of all searches the first data table 705 of the subscriber-information management DB 703 for a subscriber-information request ID by using the terminal ID "12345676" as a key. For the terminal ID "12345676", the subscriber-information request ID is found to be 0 which indicates that the subscriber is not to be requested to transmit subscriber information used for selecting presentation information. Thus; the presentation-information processing unit 702 then searches the first data table 705 for a subscriber name by using the terminal ID "12345676" as a key. For the terminal ID "12345676", the subscriber name is found to be "C". Then, the presentation-information processing unit 702 searches the second data table 706 of the subscriber-information management DB 703 for a subscriber ID by using the subscriber name "C" as a key. For the subscriber name "C", the subscriber ID is found to be "0210100". Then, the presentation-information processing unit 702 searches the third data table 707 of the presentation-information management DB 704 for presentation-information IDs by using the subscriber ID "0210100" and the information on the location-registration area, that is, the location-registration-area number 001 received from the switch 500, as a pair of keys. For the pair of keys, the presentation-information ID is found to be "0210100001". Then, the presentation-information processing unit 702 searches the fourth data table 708 of the presentation-information management DB 704 for presentation information by using the presentation-information ID "0210100001" as a key. The presentation information for the presentation-information ID "0210100001" is found to be information on video rentals with an identification of 6 (for the ○△ area) which is then transmitted to the radio-communication terminal 100c by way of the switch 500 and the radio base station 300a through the USCCH channel.

In the radio-communication terminal 100c, a USCCH processing unit 112 compares the identification "6" of the information on video rentals with the least-significant digit of the terminal ID "12345676" which is also "6". Since the identification of the information on video rentals matches the least-significant digit of the terminal ID, the information on video rentals is displayed on the display unit 111.

By the same token, a radio-communication terminal 100d with a terminal ID of 12345677 carried by the user D transmits a request for a location-registration to the switch 500 by way of the radio base station 300a. After the same sequence of processing as the user C is executed, information on video rentals with an identification of 6 (for the ○△ area) is then transmitted to the radio-communication terminal 100c by way of the switch 500 and the radio base station 300a through the USCCH channel.

In the radio-communication terminal 100d, a USCCH processing unit 112 compares the identification "6" of the information on video rentals with the least-significant digit of the terminal ID "12345677" which is "7". Since the identification of the information on video rentals does not match the least-significant digit of the terminal ID, however, the information on video rentals is not displayed on the display unit 111.

Figure 12:
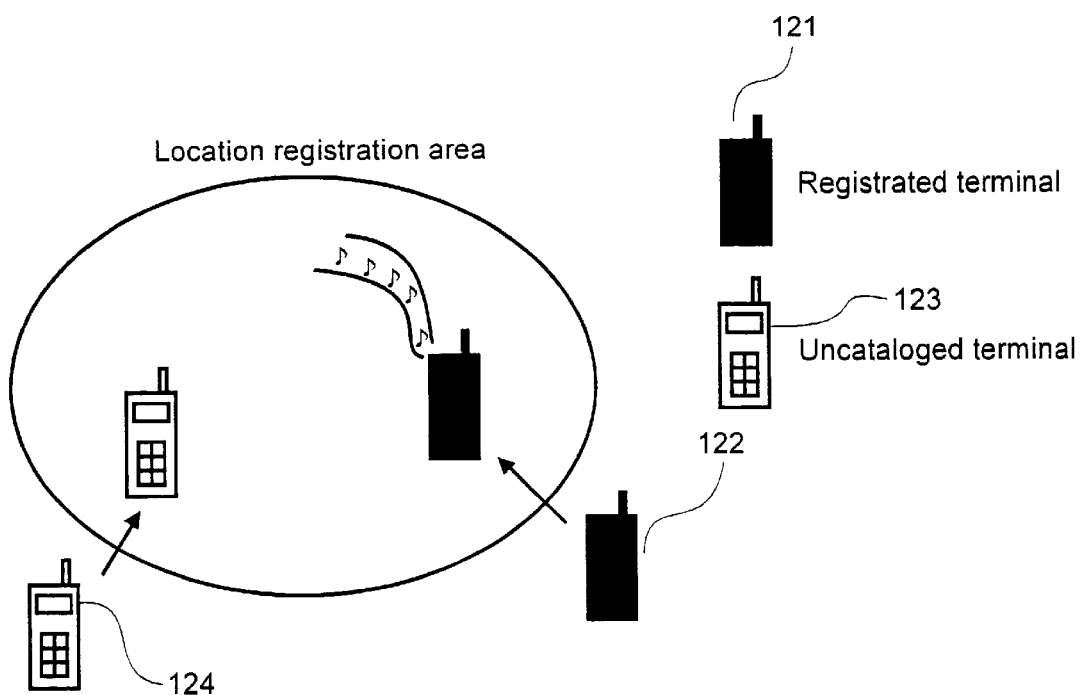
FIG. 12 is an explanatory diagram showing how presentation information is communicated when a radio-communication terminal enters or departs from a location-registration area in the radio-communication system to which the present invention is applied.
Figure 13:
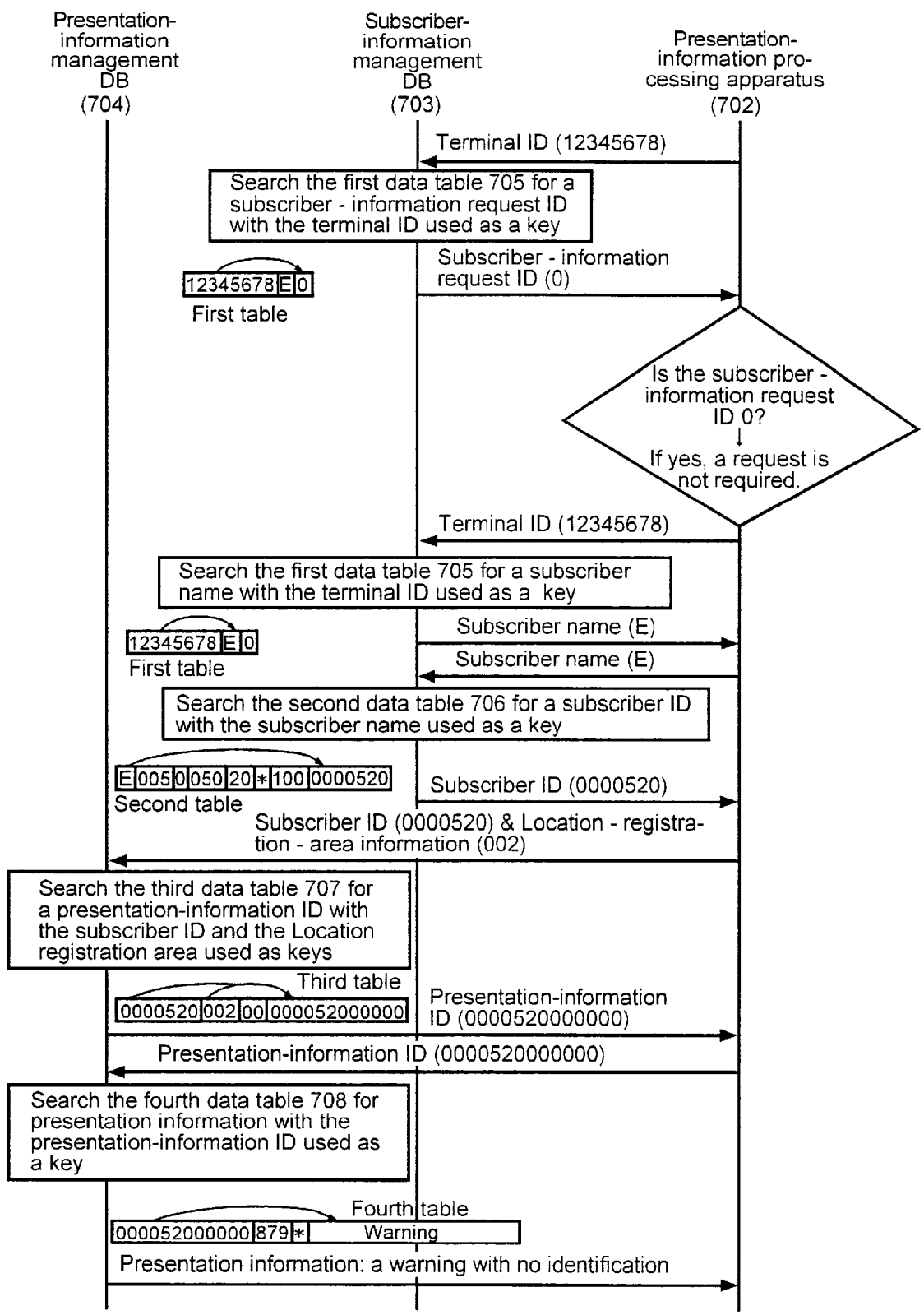
FIG. 13 is an explanatory diagram showing a sequence of processing carried out by the information processing apparatus to communicate presentation information when a radio-communication terminal enters or departs from a location-registration area.

FIG. 12 is an explanatory diagram showing how presentation information is communicated when a radio-communication terminal enters or departs from a location-registration area in the radio-communication system to which the present invention is applied. FIG. 13 is an explanatory diagram showing processing carried out by the information processing apparatus 700 to communicate presentation information when a radio-communication terminal enters or departs from a location-registration area in relation to the typical sequence shown in FIG. 7. In the following description, the presentation information is exemplified by a ringing sound which is generated when a radio-communication terminal enters or departs from a location-registration area . It should be noted that the information providing apparatus 700 does not specially take a calendar ID into consideration in the following description.

A user E desires through a contract made in advance that an alarm be generated as presentation information when the user E departs from a ☆▽ area with a location-registration-area number of 005. Assume that the user E departs from the ☆▽ area, entering a ●★ area with a location-registration-area number of 002. In the case of an alarm to be provided as presentation information, the requested information in the second data table 706 of the subscriber-information management DB 703 is set at "20"to indicate an alarm in advance. If an alarm is to be generated as presentation information when a radio-communication terminal departs from a specific area, data is cataloged in the fourth data table 708 of the presentation-information management DB 704 in advance as presentation information for generating an alarm to indicate that an area adjacent to the specific area is a location-registration area. Assume, for example, that areas surrounding the location-registration area with a location-registration-area number of 005 are location-registration areas with location-registration-area numbers of 001 to 004 and 006. In this case, in the third data table 707 of the presentation-information management DB 704, a presentation-information ID of 000052000000 is cataloged for the location-registration areas with location-registration-area numbers of 001 to 004 and 006 as a presentation-information ID common to the location-registration areas with location-registration-area numbers of 001 to 004 and 006 which have a common subscriber ID of 0000520.

When the user E enters a ●★ area with a location-registration-area number of 002, a radio-communication terminal 100e carried by the user E transmits a request for a location-registration to the switch 500 by way of the radio base station 300a. Receiving the request, the switch 500 determines whether the location-registration is possible or not. If the location-registration is found possible, the switch 500 informs the radio-communication terminal 100e that the request for the location-registration has been accepted. Since the request for the location-registration is accepted, the switch 500 transmits information on the location-registration area in which the user E exists, that is, the area ○△ with a location-registration-area number of 002, and the terminal ID "12345678" of the radio-communication terminal 100e to the presentation-information processing unit 702 employed in the information providing apparatus 700.

Receiving these pieces of information, the presentation-information processing unit 702 first of all searches the first data table 705 of the subscriber-information management DB 703 for a subscriber-information request ID by using the terminal ID "12345678" as a key. For the terminal ID "12345678", the subscriber-information request ID is found to be 0 which indicates that the subscriber is not to be requested to transmit subscriber information used for selecting presentation information. Thus, the presentation-information processing unit 702 then searches the first data table 705 for a subscriber name by using the terminal ID "12345678" as a key. For the terminal ID "12345678", the subscriber name is found to be "E". Then, the presentation-information processing unit 702 searches the second data table 706 of the subscriber-information management DB 703 for a subscriber ID by using the subscriber name "E" as a key. For the subscriber name "E", the subscriber ID is found to be "0000520". Then, the presentation-information processing unit 702 searches the third data table 707 of the presentation-information management DB 704 for presentation-information IDs by using the subscriber ID "0000520" and the information on the location-registration area, that is, the location-registration-area number 002 received from the switch 500, as a pair of keys. For the pair of keys, the presentation-information ID is found to be "0000520000".

The 3 least-significant digits 000 of the presentation-information ID does not match the location-registration-area number 002. This is because, according to the contract, an alarm is to be generated when the user E enters an area adjacent to a location-registration area with a location-registration-area number of 005 and, for this reason, a presentation-information ID of 00005200000 is cataloged in the third data table 707 of the presentation-information management DB 704 for the location-registration areas with location-registration-area numbers of 001 to 004 and 006 surrounding the area with a location-registration-area number of 005 as described above.

Then, the presentation-information processing unit 702 searches the fourth data table 708 of the presentation-information management DB 704 for presentation information by using the presentation-information ID "0000520000" as a key. The presentation information for the presentation-information ID "0000520000" is found to be an alarm signal which is then transmitted to the radio-communication terminal 100e by way of the switch 500 and the radio base station 300a. Receiving this signal, the radio-communication terminal 100e generates an alarm.

By the same token, when the user E departs from the location-registration area with a location-registration-area number of 005, entering the area with a location-registration-area number of 001, 003, 004 or 006, an alarm is also generated as well. It should be noted that presentation information of the type other than the alarm can be communicated in the same way. In addition, by registering proper data in the presentation-information management DB 704, an alarm can be communicated when a specific subscriber or a plurality of specific subscriber enter a specific location-registration area.

Figure 14:
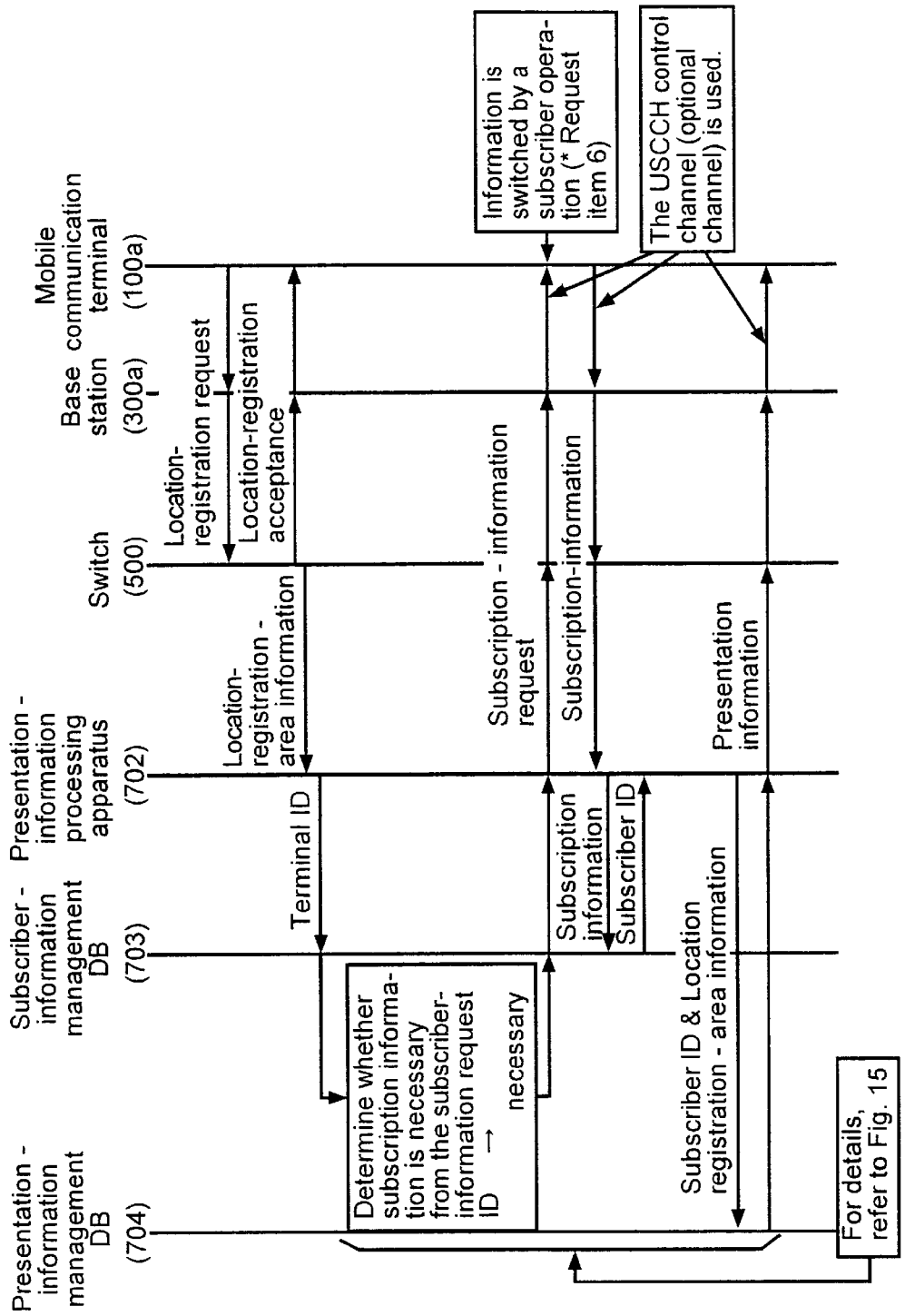
FIG. 14 is an explanatory diagram showing a sequence of an outline of processing to select presentation information according to an operation of a radio-communication terminal by a subscriber in the radio-communication system to which the present invention is applied.
Figure 15:
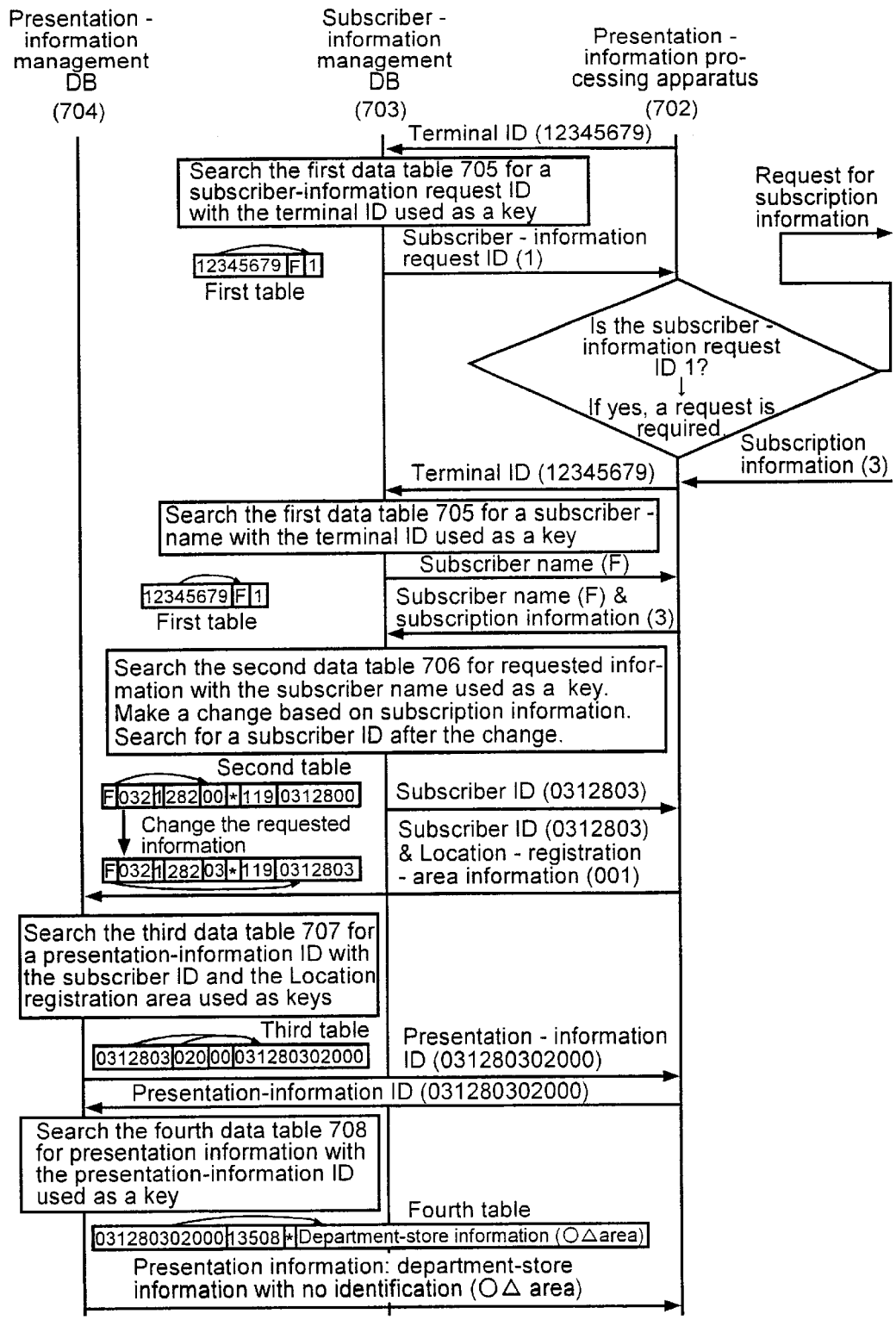
FIG. 15 is an explanatory diagram showing a sequence of an outline of processing carried out by the information providing apparatus to select presentation information according to an operation of a radio-communication terminal by a subscriber.

FIG. 14 is an explanatory diagram showing a typical sequence of an outline of processing to select presentation information according to an operation of a radio-communication terminal by a subscriber in the radio-communication system to which the present invention is applied. FIG. 15 is an explanatory diagram showing a typical sequence of an outline of processing carried out by the information providing apparatus 700 to select presentation information according to an operation of a radio-communication terminal by a subscriber. It should be noted that the information providing apparatus 700 does not specially take a calendar ID into consideration in the following description.

Assume that a user F who has made a contract to select presentation information in advance enters an ◇● area with a location-registration-area number of 020. The subscriber-information request ID of the user F in the first data table 705 of the subscriber information management DB is thus set at 1. When the user F enters the ◇● area, a radio-communication terminal 100f carried by the user F transmits a request for a location registration to the switch 500 by way of the radio base station 300a. Receiving the request, the switch 500 determines whether the location-registration is possible or not. If the location registration is found possible, the switch 500 informs the radio-communication terminal 100f that the request for the location-registration has been accepted. Since the request for the location-registration is accepted, the switch 500 transmits information on the location-registration area in which the user F exists, that is, the ◇● area with a location-registration-area number of 020, and the terminal ID "12345679" of the radio-communication terminal 100f to the presentation-information processing unit 702 employed in the information providing apparatus 700. Receiving these pieces of information, the presentation-information processing unit 702 first of all searches the first data table 705 of the subscriber-information management DB 703 for a subscriber-information request ID by using the terminal ID "12345679" as a key. For the terminal ID "12345679", the subscriber-information request ID is found to be 1 which indicates that the subscriber is to be requested to transmit subscriber information used for selecting presentation information. Thus, the presentation-information processing apparatus transmits a signal requesting subscriber information to the radio-communication terminal 100f by way of the switch 500 and the radio base station 300a through the USCCH channel.

Receiving the signal requesting subscriber information, the radio-communication terminal 100f displays a query "What is your requested information?" on the display unit 111. In response to the query, the user F presses a "3" key as subscriber information. The subscriber information "3" is then transmitted to the radio base station 300a which forwards it to the presentation information processing apparatus 702 by way the switch 500. As the subscriber information "3" is received by the presentation-information processing apparatus 702, the presentation-information processing unit 702 searches the first data table 705 for a subscriber name by using the terminal ID "12345679" as a key. For the terminal ID "12345679", the subscriber name is found to be "F". Then, the presentation-information processing unit 702 searches the second data table 706 of the subscriber-information management DB 703 for requested information and a subscriber ID by using the subscriber name "F" as a key. The requested information found in the search is changed to "03" in accordance with the subscriber information "3". As described earlier, the subscriber ID is derived from the age, the gender and the occupation of the subscriber as well as from the requested information. Thus, the subscriber ID is also changed to "0312803".

Then, the presentation-information processing unit 702 searches the third data table 707 of the presentation-information management DB 704 for presentation information IDs by using the subscriber ID "0312803" and the information on the location-registration area, that is, the location-registration-area number 020 received from the switch 500, as a pair of keys. For the pair of keys, the presentation-information ID is found to be "0312803020". Then, the presentation-information processing unit 702 searches the fourth data table 708 of the presentation-information management DB 704 for presentation information by using the presentation-information ID "0312803020" as a key. The presentation information for the presentation-information ID "0312803020" is found to be information on department stores (for the ◇● area) which is then transmitted to the radio-communication terminal 100f by way of the switch 500 and the radio base station 300a. The radio-communication terminal 100f finally displays the information on department stores on the display unit 111.

Figure 16:
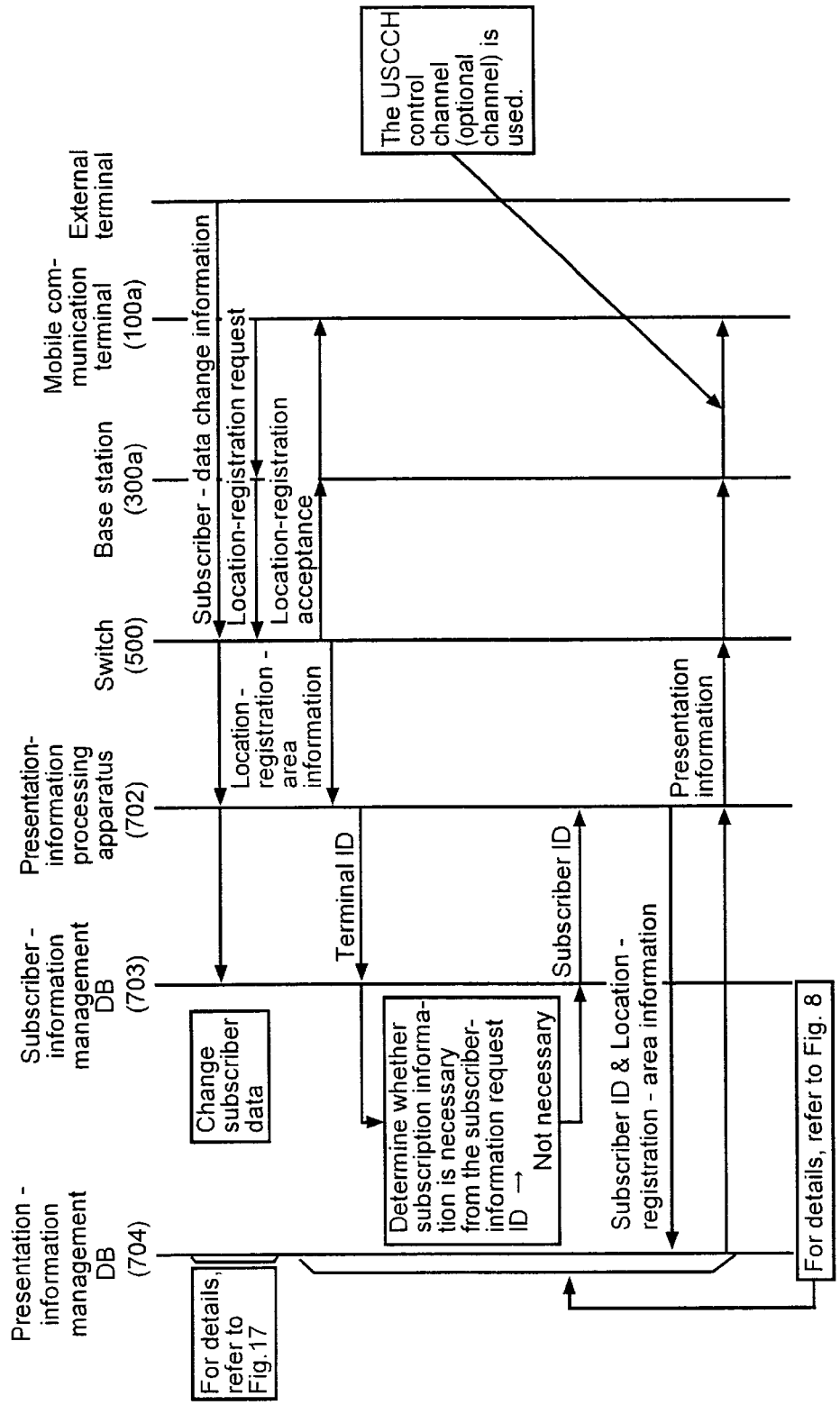
FIG. 16 is an explanatory diagram showing a sequence of an outline of processing to select presentation information according to an operation coming from an external source outside the radio-communication system to which the present invention is applied.
Figure 17:
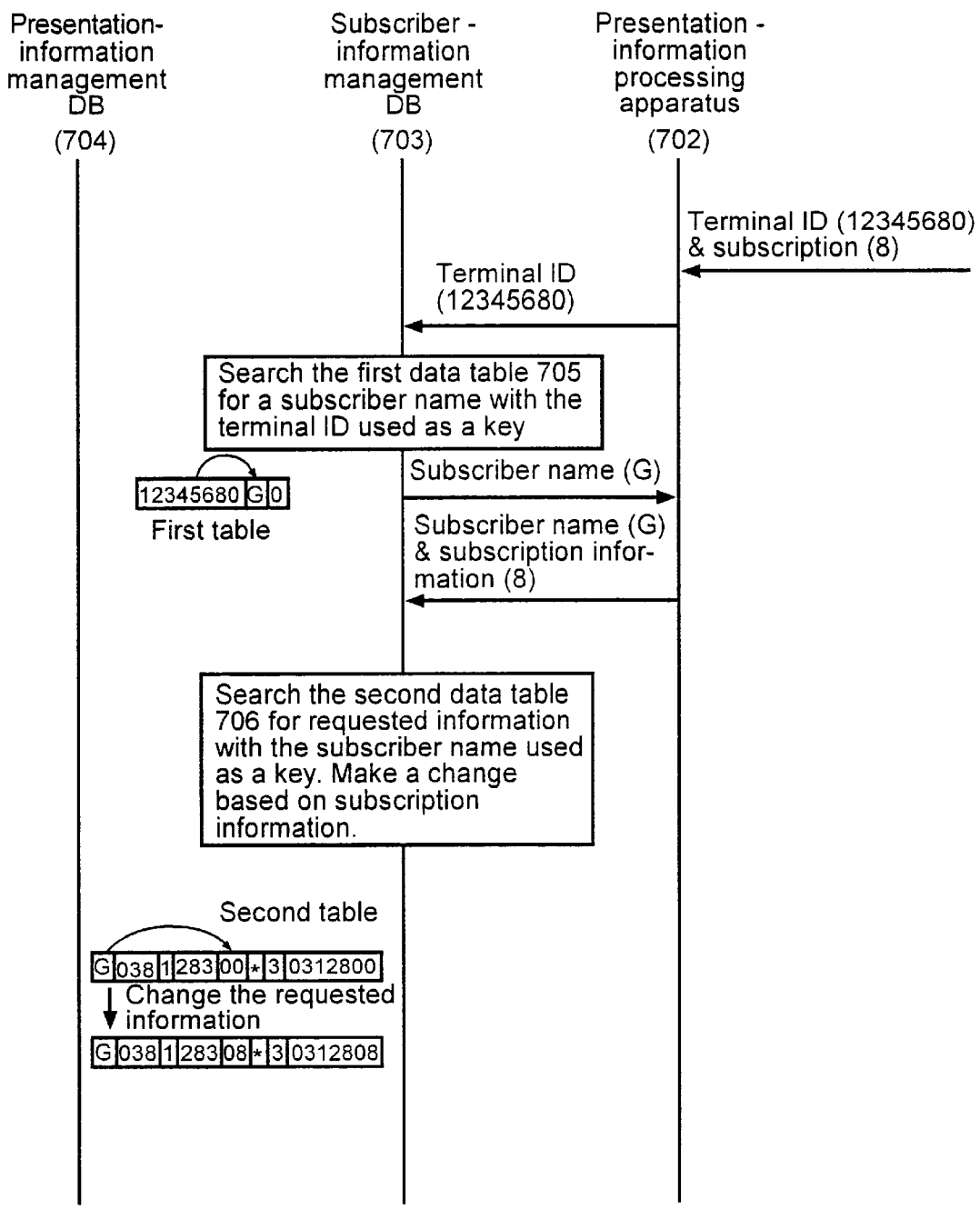
FIG. 17 is an explanatory diagram showing a sequence of an outline of processing carried out by the information providing apparatus to select presentation information according to an operation coming from an external source outside the radio-communication system to which the present invention is applied.

FIG. 16 is an explanatory diagram showing a typical sequence of an outline of processing to select presentation information according to an operation coming from an external source outside the radio-communication system to which the present invention is applied. FIG. 17 is an explanatory diagram showing a typical sequence of an outline of processing carried out by the information providing apparatus 700 to select presentation information according to an operation coming from an external source outside the radio-communication system to which the present invention is applied. It should be noted that the information providing apparatus 700 does not specially take a calendar ID into consideration in the following description.

A user G makes an access to the radio-communication system by using a terminal other than a radio-communication terminal 100 such as a public telephone. The user G enters the ID 12345680 of its radio-communication terminal 100 and subscriber information of "8" for changing the requested information to the terminal in accordance with guidance provided by the radio-communication system.

The ID 12345680 and the subscriber information "8" are transmitted by the terminal to the presentation information processing apparatus 702 by way of the switch 500. Receiving these pieces of information, the presentation-information processing unit 702 first of all searches the first data table 705 of the subscriber-information management DB 703 for a subscriber name by using the terminal ID "12345680" as a key. For the terminal ID "12345680", the subscriber name is found to be "G". Then, the presentation-information processing unit 702 searches the second data table 706 of the subscriber-information management DB 703 for requested information and a subscriber ID by using the subscriber name "G" as a key. The requested information is changed to "08" in accordance with the subscriber information "8". As described earlier, the subscriber ID is derived from the age, the gender and the occupation of the subscriber as well as from the requested information. Thus, the subscriber ID is also changed to "0312808". Then, assume that the user G enters the ◊● area with a location-registration-area number of 020.

When the user G enters the ◊● area, a radio-communication terminal 100g carried by the user G transmits a request for a location-registration to the switch 500 by way of the radio base station 300a. Receiving the request, the switch 500 determines whether the location-registration is possible or not. If the location-registration is found possible, the switch 500 informs the radio-communication terminal 100g that the request for the location-registration has been accepted. Since the request for the location registration is accepted, the switch 500 transmits information on the location-registration area in which the user G exists, that is, the ◊● area with a location-registration-area number of 020, and the terminal ID "12345680" of the radio-communication terminal 100g to the presentation-information processing unit 702 employed in the information providing apparatus 700.

Receiving these pieces of information, the presentation-information processing unit 702 first of all searches the first data table 705 of the subscriber-information management DB 703 for a subscriber-information request ID by using the terminal ID "12345680" as a key. For the terminal ID "12345680", the subscriber-information request ID is found to be 0 which indicates that the subscriber is not to be requested to transmit subscriber information used for selecting presentation information. Thus, the presentation-information processing unit 702 searches the first data table 705 for a subscriber name by using the terminal ID "12345680" as a key. For the terminal ID "12345680", the subscriber name is found to be "G". Then, the presentation-information processing unit 702 searches the second data table 706 of the subscriber-information management DB 703 for a subscriber ID by using the subscriber name "G" as a key. For, the subscriber name "G", the subscriber ID "0312808" which was changed by the subscriber information as described earlier is found. Then, the presentation-information processing unit 702 searches the third data table 707 of the presentation-information management DB 704 for presentation-information IDs by using the subscriber ID "0312808" and the information on the location-registration area, that is, the location-registration-area number 020 received from the switch 500, as a pair of keys. For the pair of keys, the presentation-information ID is found to be "0312808020". Then, the presentation-information processing unit 702 searches the fourth data table 708 of the presentation-information management DB 704 for presentation information by using the presentation-information ID "0312808020" as a key. The presentation information for the presentation-information ID "0312808020" is found to be information on restaurants (for the ◊● area) which is then transmitted to the radio-communication terminal 100g by way of the switch 500 and the radio base station 300a. The radio-communication terminal 100g finally displays the information on restaurants on the display unit 111.

Figure 18:
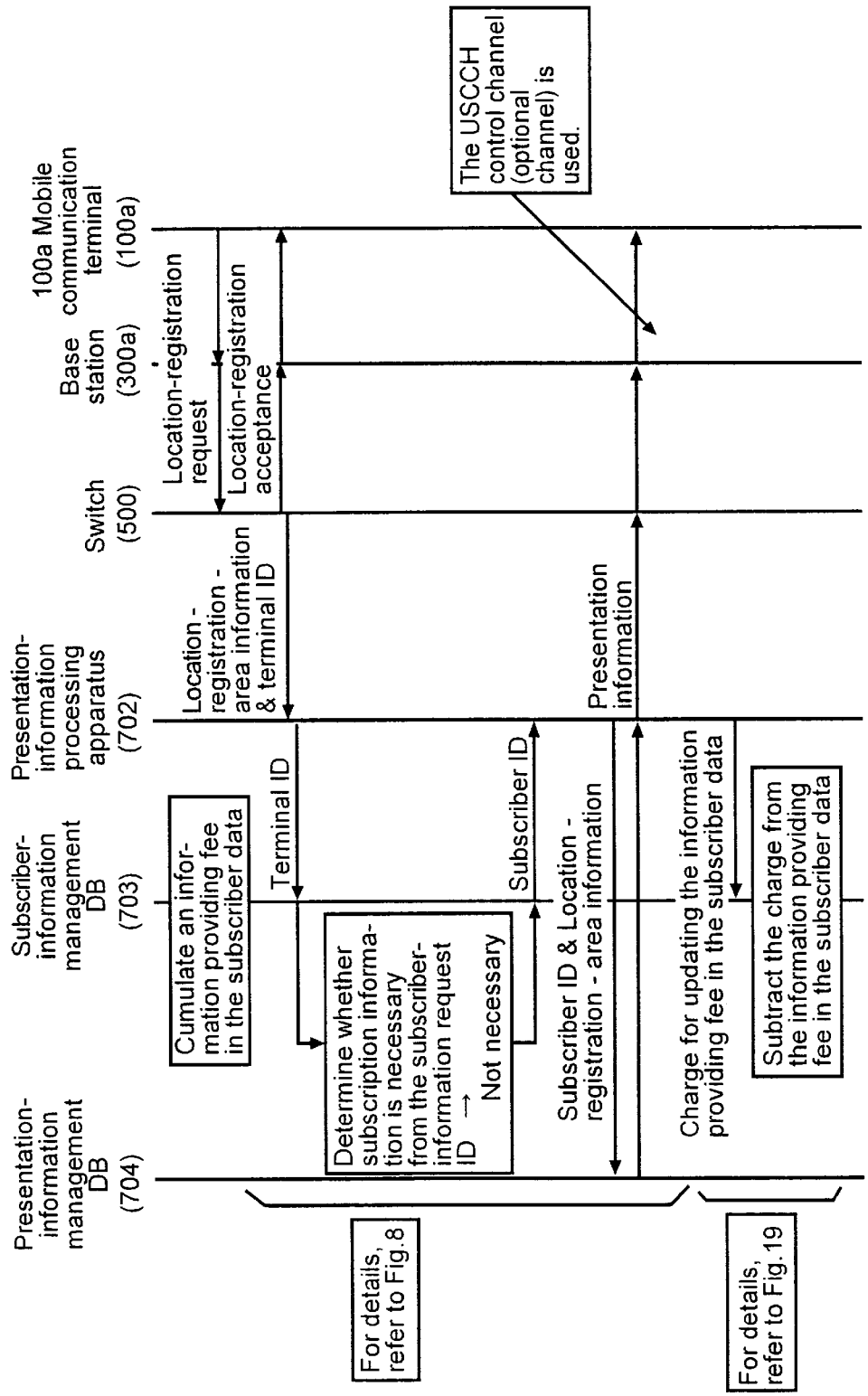
FIG. 18 is an explanatory diagram showing a sequence of an outline of processing to compute a service utilization fee in the radio-communication system to which the present invention is applied.
Figure 19:
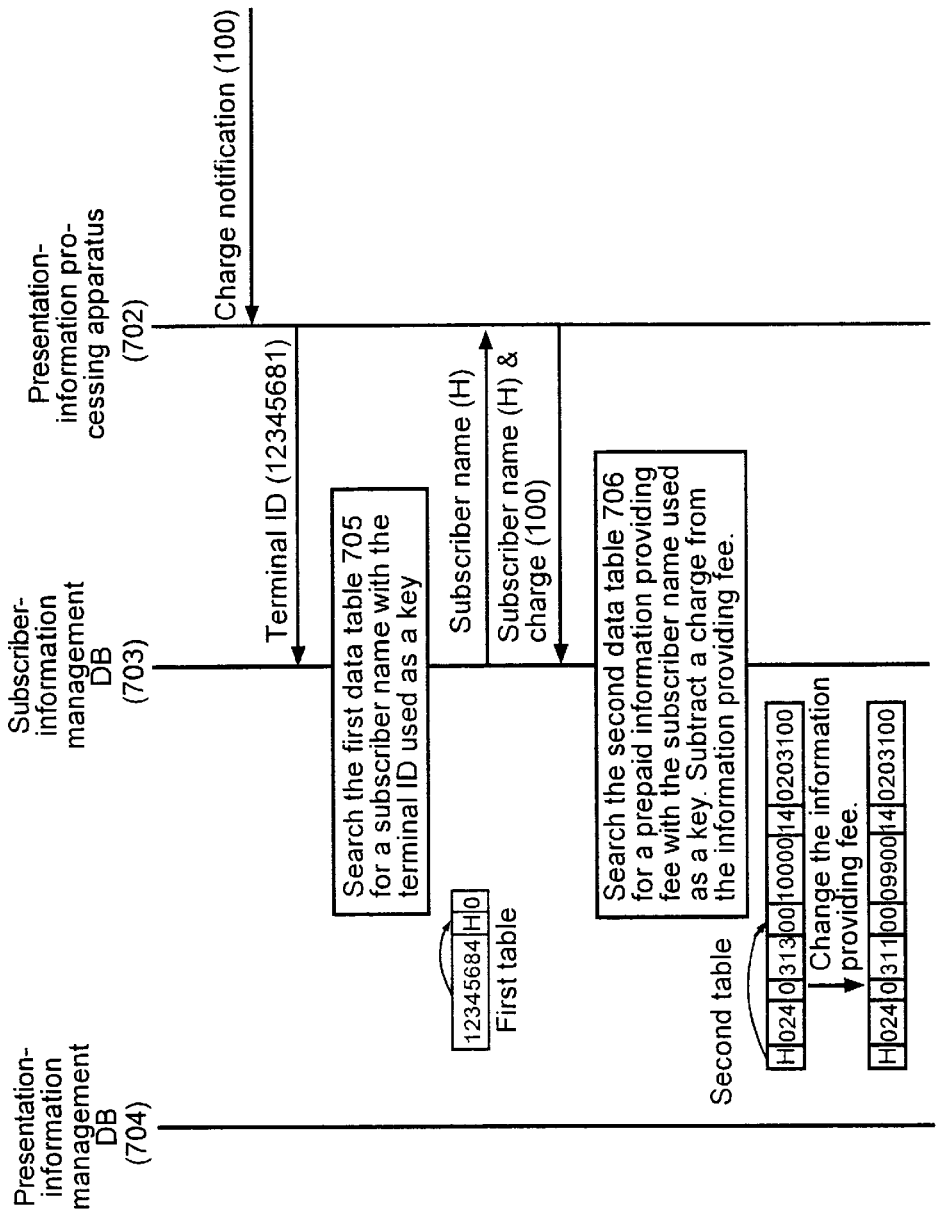
FIG. 19 is an explanatory diagram showing a sequence of an outline of processing carried out by the information providing apparatus to compute a service utilization fee.

FIG. 18 is an explanatory diagram showing a typical sequence of an outline of processing to compute a service utilization fee in the radio-communication system to which the present invention is applied. FIG. 19 is an explanatory diagram showing a typical sequence of an outline of processing carried out by the information providing apparatus 700 to compute a service utilization fee. The figures show sequences in which an information providing fee is paid by using a prepaid system as an example. It should be noted that the information providing apparatus 700 does not specially take a calendar ID into consideration in the following description. As described above, however, the calendar ID can also be taken into consideration.

Assume that a user H who has made a contract to pay an information providing fee using a prepaid system in advance enters an ○△ area with a location-registration-area number of 001. The second data table 706 of the subscriber-information management DB 703 includes a record indicating that the user H has prepaid an information providing fee of 10,000. When the user H enters the ○△ area, a radio-communication terminal 100h carried by the user H transmits a request for a location-registration to the switch 500 by way of the radio base station 300a. Receiving the request, the switch 500 determines whether the location-registration is possible or not. If the location registration is found possible, the switch 500 informs the radio-communication terminal 100h that the request for the location-registration has been accepted. Since the request for the location-registration is accepted, the switch 500 transmits information on the location-registration area in which the user H exists, that is, the ○△ area with a location-registration-area number of 001, and the terminal ID "12345681" of the radio-communication terminal 100h to the presentation-information processing unit 702 employed in the information providing apparatus 700. Receiving these pieces of information, the presentation-information processing unit 702 first of all searches the first data table 705 of the subscriber-information management DB 703 for a subscriber-information request ID by using the terminal ID "12345681" as a key. For the terminal ID "12345679", the subscriber-information request ID is found to be 0 which indicates that the subscriber is not to be requested to transmit subscriber information used for selecting presentation information. Thus, the presentation-information processing unit 702 searches the first data table 705 for a subscriber name by using the terminal ID "12345681" as a key. For the terminal ID "12345681", the subscriber name is found to be "H".

Then, the presentation-information processing unit 702 searches the second data table 706 of the subscriber-information management DB 703 for a subscriber ID by using the subscriber name "H" as a key. For, the subscriber name "H", the subscriber ID "0203100" is found. Then, the presentation-information processing unit 702 searches the third data table 707 of the presentation-information management DB 704 for presentation-information IDs by using the subscriber ID "0203100" and the information on the location-registration area, that is, the location-registration-area number 001 received from the switch 500, as a pair of keys. For the pair of keys, the presentation-information ID is found to be "0203100001". Then, the presentation-information processing unit 702 searches the fourth data table 708 of the presentation-information management DB 704 for presentation information by using the presentation-information ID "0203100001" as a key. The presentation information for the presentation-information ID "0203100001" is found to be information on video rentals (for the ○Δ area) which is then transmitted to the radio-communication terminal 100*g* by way of the switch 500 and the radio base station 300*a*. The radio-communication terminal 100*h* finally displays the information on restaurants on the display unit 111. As shown in the fourth data table 708 of the presentation-information management DB 704, the information on video rentals is provided at a charging service of 100 per time. Therefore, the presentation-information processing apparatus 702 subtracts 100 from the amount 10,000 prepaid by the user H, changing the information providing fee stored in the second data table 706 of the subscriber-information management DB 703 from 10,000 to 9,900.

It should be noted that fee information can also be found from another apparatus such as the switch 500. In this case, the switch 500 or the other information informs the presentation-information processing apparatus 702 of a charge required for the transmission of the presentation information after transmission of the information on video rentals (for the ○Δ area). Receiving the information on the charge, the presentation-information processing unit 702 searches the second data table 706 of the subscriber-information management DB 703 for an information providing fee by using the subscriber name "H" as a key. The charge received from the switch 500 or the other apparatus is then subtracted from the information providing fee found in the search and the difference is used to update the stored fee.

The above description has explained a case in which a charge is subtracted from an information providing fee. On the contrary, a charge can also be added to a cumulative liability or service points to be borne by the user in the same way. In this case, a charge can be added to a cumulative liability by adopting the subtraction described above as it is if the charge is set at a negative value. In addition, the technique described above can be adopted to change the domain of a location-registration area in dependence on the amount of money paid to or by the information provider by changing the data registered in the third data table 707 of the presentation-information management DB 704.

Figure 20:
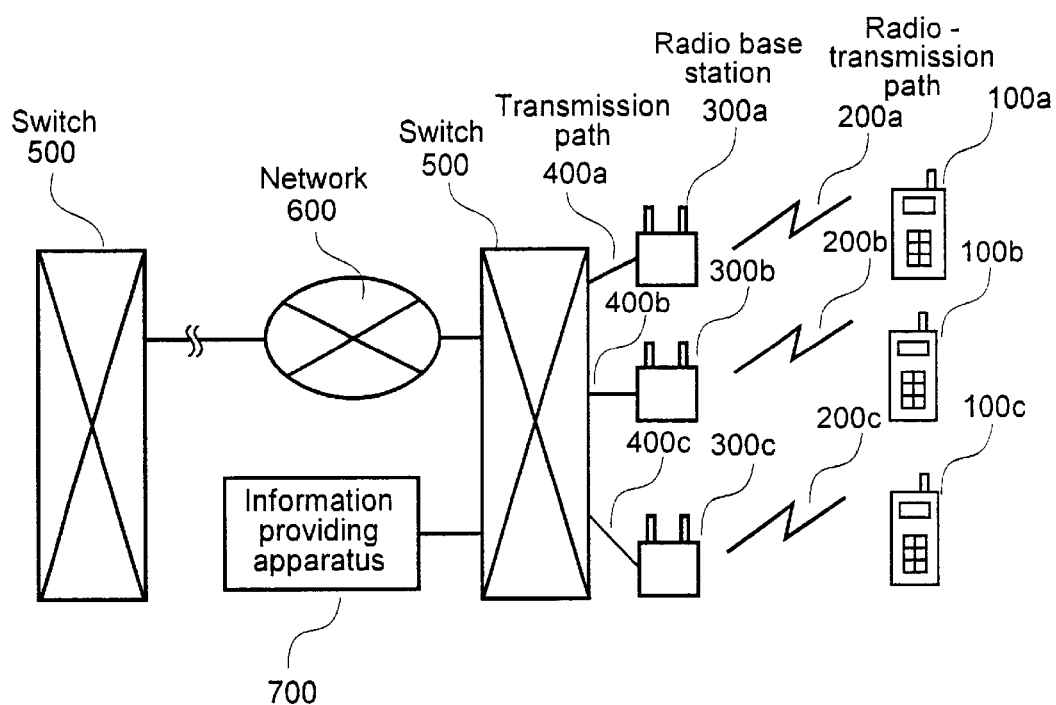
FIG. 20 is a diagram showing the configuration of another embodiment implementing the radio-communication system to which the present invention is applied.

FIG. 20 is a diagram showing the configuration of another embodiment implementing the radio-communication system to which the present invention is applied. As shown in the figure, the information providing apparatus 700 is connected directly to the switch 500.

In this embodiment, presentation information stored in the presentation-information management DB 704 in the information providing apparatus 700 is transmitted to a radio-communication terminal 100 only when the terminal 100 enters an area covered by one of the radio base stations 300*a* to 300*c* connected to the switch 500. By applying the present invention to such a radio-communication system, information peculiar to a narrower area can be transmitted since a switch 500 has its own information providing apparatus 700.

FIG. 21 is a diagram showing the configuration of a further embodiment implementing the radio-communication system to which the present invention is applied. As shown in the figure, in this radio-communication system, an external-device IF unit 711 of an information providing apparatus 710 is directly connected to an external-device IF unit 312 employed in a radio base station 310.

In this radio-communication system, presentation information stored in a presentation-information management DB 713 of the information providing apparatus 710 connected to the radio base station 310 is transmitted only to a radio-communication terminal 130 which enters a location-registration area covered by the radio base station 310. By adopting such a radio-communication system, the recognizable area becomes small in size in comparison with a location-registration area covered by a plurality of radio base stations so that information peculiar to an even narrower area can be transmitted. Unlike the information providing apparatus 700 connected to a network in the embodiment described earlier, the information providing apparatus 710 employed in this embodiment is dedicated to only one of several radio base stations 310. Thus, in some cases, we can assume that such an information providing apparatus 710 does not occupy a large space and that many kinds of information to be distributed are not that necessary. That is, there may be only 1 or few kinds of information stored in the presentation-information management DB 713 to be distributed to all subscribers. In addition, the radio base station 310 may continuously transmit presentation information by using the USCCH channel without being triggered by a radio communication terminal 130.

As an example, consider a case in which a user I carrying a radio-communication terminal 100*i* with a terminal ID of 12345682 enters an area covered by a radio base station 310 which is installed on an electric pole on the building of a ◇♦ department store. The presentation-information processing apparatus 710 reads out information on entertainment at the $7^{th}$ floor stored in the presentation-information management DB 713 in advance and keeps transmitting the information repeatedly by using the USCCH channel through the radio station base 310. As the user I enters the area covered by a radio base station 310, the radio-communication terminal 100*i* receives the information on entertainment on the $7_{th}$ floor, displaying it on the display unit 111 by way of the USCCH processing unit 112.

In the descriptions of most of sequences given above, the calendar ID is not taken into consideration. It should be noted that the sequences can also be executed by taking the calendar ID into consideration. In addition, the sequences of processing provided by the present invention can also be combined properly.

As described above, according to the present invention, various kinds of information peculiar to an area in a radio-communication system can be communicated to a radio-communication terminal or a plurality of radio-communication terminals at the same time.

According to the present invention, in a network wherein information on positions of radio-communication terminals is controlled and recognized in area units narrower than areas of a cellular network or pager areas, information peculiar to a narrow area is transmitted to only radio-communication terminals located in a smallest unit area in which the position of a radio-communication terminal can be recognized or a plurality of such smallest unit areas.

In addition, according to the present invention, both the information provider and the subscriber are capable of selecting information by recognition of the identification of the subscriber and the identification of information desired by the subscriber using subscriber data stored in a subscriber-information management data base (DB).

Moreover, according to the present invention, it is possible to provide service media suitable for dissemination of information such as commercial information wherein it is not necessary for the subscriber to make an access to the radio-communication system each time the subscriber wants to obtain information and to prevent the cost burden borne by the subscriber from rising.

What is claimed is:

1. An information communicating method adopted in a radio-communication system comprising a plurality of radio-communication terminals and a plurality of radio base stations carrying out radio-communications with said radio-communication terminal, said information communicating method comprising the steps of:
    receiving a request for a location-registration including information on a location-registration area and a terminal ID and coming from said radio-communication terminals located in one specific location-registration area or a plurality of specific location-registration areas each serving as a smallest unit area recognizable by said radio-communication system;
    searching for a subscriber-information-request ID and a subscriber ID from said terminal ID included in said received request; and
    communicating presentation information peculiar to said specific location-registration area as indicated by a presentation-information ID determined by said subscriber ID and said information on said specific location-registration area to said radio-communication terminal located in said specific location-registration area through a control signal channel;
    wherein, if said subscriber-information-request ID found at said search step indicates that subscriber information is required, said information communicating method further comprises the steps of:
        transmitting a request for subscriber information to said radio-communication terminal;
        changing said subscriber ID on the basis of said subscriber information received from said radio-communication terminal; and
        transmitting presentation information indicated by a presentation-information ID determined by said changed subscriber ID and said information on said specific location-registration area to said radio-communication terminal.

2. An information communicating method, adopted in a radio-communication system comprising a plurality of radio-communication terminals and a plurality of radio base stations carrying out radio-communications with said radio-communications terminal, said information communicating method comprising the steps of:
    receiving a request for a location-registration including information on a location-registration area and a terminal ID and coming from said radio-communication terminals located in one specific location-registration area or a plurality of specific location-registration areas each serving as a smallest unit area recognizable by said radio-communication system;
    searching for a subscriber-information-request ID and a subscriber ID from said terminal ID included in said received request; and
    communicating presentation information peculiar to said specific location-registration area as indicated by a presentation-information ID determined by said subscriber ID and said information on said specific location-registration area to said radio-communication terminal located in said specific location-registration area through a control signal channel;
    wherein, if said subscriber-information-request ID found at said search step indicates that subscriber information is required, said information communicating method further comprises the steps of:
        transmitting a request for subscriber information to said radio-communication terminal;
        changing said subscriber ID on the basis of said subscriber information received from said radio-communication terminal;
        transmitting presentation information indicated by a presentation-information ID determined by said changed subscriber ID and said information on said specific location-registration area to said radio-communication terminal;
    receiving information including a terminal ID and subscriber information to be used for changing subscriber data from a terminal other than said radio-communication terminals; and
    changing said subscriber ID by using said subscriber information used for changing subscriber data received from said other terminal.

3. An information providing apparatus comprising:
    a subscriber-information management data base (DB) for storing a subscriber-information-request ID and a subscriber ID for each terminal ID;
    a presentation-information management DB for storing a presentation-information ID for said subscriber ID and presentation information for said presentation-information ID;
    a network interface, connected to external devices, for receiving and transmitting signals; and
    a processing unit for carrying out processing to communicate presentation information on the basis of information stored in said subscriber-information management DB and said presentation-information management DB, wherein said processing comprises the steps of:
        receiving a request for a location-registration including information on a location-registration area and a terminal ID and coming from radio-communication terminals located in one specific location-registration area or a plurality of specific location-registration areas each serving as a smallest unit area recognizable by a radio-communication system;
        searching said subscriber-information management DB for a subscriber-information-request ID and a subscriber ID by using said terminal ID included in said received request;

searching said presentation-information management DB for a presentation-information ID by using said subscriber ID and said information on said specific location-registration area;

searching said presentation-information management DB for presentation information peculiar to said specific location-registration area by using said presentation information ID; and communicating said presentation information to said radio-communication terminal located in said specific location-registration area through a control signal channel;

wherein, if said subscriber-information-request ID found at said search step indicates that subscriber information is required, said processing carried out by said processing unit further comprises the steps of:

transmitting a request for subscriber information to said radio-communication terminal;

changing said subscriber ID on the basis of said subscriber information received from said radio-communication terminal; and transmitting presentation information indicated by a presentation-information ID determined by said changed subscriber ID and said information on said specific location-registration area to said radio-communication terminal.

4. An information providing apparatus comprising:

a subscriber-information management data base (DB) for storing a subscriber-information-request ID and a subscriber ID for each terminal ID;

a presentation-information management DB for storing a presentation-information ID for said subscriber ID and presentation information for said presentation-information ID;

a network interface, connected to external devices, for receiving and transmitting signals; and a processing unit for carrying out processing to communicate presentation information on the basis of information stored in said subscriber-information management DB and said presentation-information management DB, wherein said processing comprises the steps of:

receiving a request for a location-registration including information on a location-registration area and a terminal ID and coming from radio-communication terminals located in one specific location-registration area or a plurality of specific location-registration areas each serving as a smallest unit area recognizable by a radio-communication system;

searching said subscriber-information management DB for a subscriber-information-request ID and a subscriber ID by using said terminal ID included in said received request;

searching said presentation-information management DB for a presentation-information ID by using said subscriber ID and said information on said specific location-registration area;

searching said presentation-information management DB for presentation information peculiar to said specific location-registration area by using said presentation-information ID;

communicating said presentation information to said radio-communication terminal located in said specific location-registration area through a control signal channel;

wherein, if said subscriber-information-request ID found at said search step indicates that subscriber information is required, said processing carried out by said processing unit further comprises the steps of:

transmitting a request for subscriber information to said radio-communication terminal;

changing said subscriber ID on the basis of said subscriber information received from said radio-communication terminal; and transmitting presentation information indicated by a presentation-information ID determined by said changed subscriber ID and said information on said specific location-registration area to said radio-communication terminal;

receiving information including a terminal ID and subscriber information to be used for changing subscriber data from a terminal other than said radio-communication terminals; and changing said subscriber ID by using said subscriber information used for changing subscriber data received from said other terminal.

* * * * *